(12) United States Patent
Zhao et al.

(10) Patent No.: US 9,161,034 B2
(45) Date of Patent: *Oct. 13, 2015

(54) SCALABLE MULTI-THREAD VIDEO DECODING

(71) Applicant: Microsoft Technology Licensing, LLC, Redmond, WA (US)

(72) Inventors: Weidong Zhao, Bellevue, WA (US); Yaming He, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/266,609

(22) Filed: Apr. 30, 2014

(65) Prior Publication Data

US 2014/0233652 A1    Aug. 21, 2014

Related U.S. Application Data

(63) Continuation of application No. 13/848,631, filed on Mar. 21, 2013, now Pat. No. 8,743,948, which is a continuation of application No. 11/703,613, filed on Feb. 6, 2007, now Pat. No. 8,411,734.

(51) Int. Cl.
*H04L 29/06* (2006.01)
*H04N 19/436* (2014.01)
(Continued)

(52) U.S. Cl.
CPC ......... *H04N 19/00521* (2013.01); *H04N 19/43* (2014.11); *H04N 19/436* (2014.11); *H04N 19/439* (2014.11); *H04N 19/44* (2014.11); *H04N 19/513* (2014.11)

(58) Field of Classification Search
USPC ........................................................ 375/240
See application file for complete search history.

(56) References Cited

U.S. PATENT DOCUMENTS

| 4,309,754 A | 1/1982 | Dinwiddie, Jr. |
| 4,642,756 A | 2/1987 | Sherrod |

(Continued)

FOREIGN PATENT DOCUMENTS

| CN | 1366775 | 8/2002 |
| CN | 1960472 | 5/2007 |

(Continued)

OTHER PUBLICATIONS

Task concurrency management methodology|http://citeseerx.ist.psu.edu/viewdoc/download?doi=10.1.1.134.6304&rep=rep1&type=pdf|Wong et al.|2001|pp. 170-175.*

(Continued)

*Primary Examiner* — Mahfuzur Rahman
(74) *Attorney, Agent, or Firm* — Judy Yee; Micky Minhas

(57) ABSTRACT

Decoding tasks are identified for decoding encoded video. Decoding tasks may include entropy decoding tasks, motion compensation tasks, inverse frequency transform tasks, inverse quantization tasks, intra decoding tasks, loop filtering tasks, or other tasks. Task dependencies are identified for the video decoding tasks. For example, one or more decoding tasks may depend on prior completion of entropy decoding tasks. The decoding tasks are prioritized based at least in part on the task dependencies. For example, a higher priority may be assigned to tasks that must be completed before other tasks that depend on them can begin. Prioritized decoding tasks are selected to be performed by hardware threads. For example, a first hardware thread may perform a first decoding task that does not depend on any uncompleted tasks while a second hardware thread performs a second decoding task that does not depend on any uncompleted tasks.

20 Claims, 20 Drawing Sheets

(51) Int. Cl.
*H04N 19/513* (2014.01)
*H04N 19/44* (2014.01)
*H04N 19/43* (2014.01)
*H04N 19/42* (2014.01)

(56) References Cited

U.S. PATENT DOCUMENTS

| | | |
|---|---|---|
| 5,465,335 A | 11/1995 | Anderson |
| 5,909,559 A | 6/1999 | So |
| 6,002,801 A | 12/1999 | Strongin et al. |
| 6,006,303 A | 12/1999 | Barnaby et al. |
| 6,105,048 A | 8/2000 | He |
| 6,219,502 B1 | 4/2001 | Osari et al. |
| 6,249,288 B1 | 6/2001 | Campbell |
| 6,278,691 B1 | 8/2001 | Ohyama et al. |
| 6,298,166 B1 | 10/2001 | Ratnakar et al. |
| 6,427,058 B1 | 7/2002 | Akiba et al. |
| 6,438,169 B1 | 8/2002 | Takashima et al. |
| 6,445,314 B1 | 9/2002 | Zhang et al. |
| 6,574,279 B1 | 6/2003 | Vetro et al. |
| 6,782,368 B2 | 8/2004 | Fujii et al. |
| 6,823,016 B1 | 11/2004 | Nguyen et al. |
| 6,963,347 B1 | 11/2005 | Selvaggi et al. |
| 7,043,088 B2 | 5/2006 | Chiu et al. |
| 7,072,404 B2 | 7/2006 | Itokawa |
| 7,085,322 B2 | 8/2006 | Ngai et al. |
| 7,099,389 B1 | 8/2006 | Yu et al. |
| 7,116,714 B2 | 10/2006 | Hannuksela |
| 7,130,526 B2 | 10/2006 | Abelard et al. |
| 7,289,047 B2 | 10/2007 | Nagori |
| 7,366,236 B1 | 4/2008 | Winger |
| 7,370,325 B1 | 5/2008 | Hull et al. |
| 7,499,960 B2 | 3/2009 | Dageville et al. |
| 7,573,407 B2 | 8/2009 | Reznik |
| 7,653,128 B2 | 1/2010 | Shibata et al. |
| 7,735,087 B2 | 6/2010 | Hayashi |
| 7,817,723 B2 | 10/2010 | Wiegand et al. |
| 7,889,788 B2 | 2/2011 | Toma et al. |
| 8,213,518 B1* | 7/2012 | Wang et al. ............. 375/240.25 |
| 8,291,448 B2 | 10/2012 | Pekonen et al. |
| 8,396,082 B2 | 3/2013 | Hannuksela et al. |
| 2002/0036707 A1 | 3/2002 | Gu |
| 2003/0185298 A1 | 10/2003 | Alvarez et al. |
| 2003/0189982 A1* | 10/2003 | MacInnis ............... 375/240.24 |
| 2003/0210163 A1 | 11/2003 | Yang |
| 2003/0235251 A1 | 12/2003 | Hsiun et al. |
| 2004/0117427 A1* | 6/2004 | Allen et al. ................. 709/200 |
| 2004/0146109 A1 | 7/2004 | Kondo et al. |
| 2004/0190617 A1 | 9/2004 | Shen et al. |
| 2004/0208245 A1 | 10/2004 | MacInnis et al. |
| 2005/0013362 A1 | 1/2005 | Pearson et al. |
| 2005/0053157 A1 | 3/2005 | Lillevold |
| 2005/0123207 A1 | 6/2005 | Marpe et al. |
| 2005/0169374 A1 | 8/2005 | Marpe et al. |
| 2005/0175091 A1 | 8/2005 | Puri et al. |
| 2005/0179568 A1 | 8/2005 | Wee et al. |
| 2005/0180511 A1 | 8/2005 | Arafune et al. |
| 2005/0220190 A1 | 10/2005 | Ha et al. |
| 2005/0289505 A1 | 12/2005 | Williams |
| 2006/0002479 A1 | 1/2006 | Fernandes |
| 2006/0056513 A1 | 3/2006 | Shen et al. |
| 2006/0056517 A1 | 3/2006 | MacInnis et al. |
| 2006/0056708 A1 | 3/2006 | Shen et al. |
| 2006/0098734 A1 | 5/2006 | Cho et al. |
| 2006/0114995 A1 | 6/2006 | Robey et al. |
| 2006/0126726 A1 | 6/2006 | Lin et al. |
| 2006/0126744 A1 | 6/2006 | Peng et al. |
| 2006/0133479 A1 | 6/2006 | Chen et al. |
| 2006/0133770 A1 | 6/2006 | Shibata et al. |
| 2006/0193383 A1 | 8/2006 | Alvarez et al. |
| 2006/0204119 A1 | 9/2006 | Feng et al. |
| 2006/0215754 A1 | 9/2006 | Buxton et al. |
| 2006/0222254 A1 | 10/2006 | Zandi et al. |
| 2006/0227872 A1 | 10/2006 | Mori et al. |
| 2006/0233525 A1 | 10/2006 | Shibata et al. |
| 2006/0239343 A1 | 10/2006 | Mohsenian |
| 2006/0248516 A1 | 11/2006 | Gordon |
| 2007/0030911 A1 | 2/2007 | Yoon |
| 2007/0033494 A1 | 2/2007 | Wenger et al. |
| 2007/0036223 A1 | 2/2007 | Srinivasan |
| 2007/0071095 A1 | 3/2007 | Lim |
| 2007/0120711 A1 | 5/2007 | Hu et al. |
| 2007/0121728 A1 | 5/2007 | Wang et al. |
| 2007/0124733 A1* | 5/2007 | Bril et al. ...................... 718/104 |
| 2007/0126853 A1 | 6/2007 | Ridge et al. |
| 2007/0160151 A1 | 7/2007 | Bolton et al. |
| 2007/0183491 A1 | 8/2007 | Pearson et al. |
| 2007/0183507 A1 | 8/2007 | Maheshwari et al. |
| 2007/0201562 A1 | 8/2007 | Ganesh et al. |
| 2007/0223595 A1 | 9/2007 | Hannuksela et al. |
| 2007/0230582 A1 | 10/2007 | Chiu et al. |
| 2007/0233989 A1 | 10/2007 | Garcia-Arellano et al. |
| 2007/0286276 A1 | 12/2007 | Gartner et al. |
| 2007/0291857 A1 | 12/2007 | Hussain |
| 2007/0297501 A1 | 12/2007 | Hussain et al. |
| 2008/0013620 A1 | 1/2008 | Hannuksela et al. |
| 2008/0048894 A1 | 2/2008 | Ridge et al. |
| 2008/0107184 A1 | 5/2008 | Katsavounidis et al. |
| 2008/0123736 A1 | 5/2008 | Sekiguchi et al. |
| 2008/0137736 A1 | 6/2008 | Richardson et al. |
| 2008/0159408 A1 | 7/2008 | Degtyarenko |
| 2008/0181308 A1 | 7/2008 | Wang et al. |
| 2008/0187053 A1 | 8/2008 | Zhao et al. |
| 2008/0285642 A1 | 11/2008 | Jahanghir et al. |
| 2008/0304520 A1 | 12/2008 | Hannuksela et al. |
| 2009/0002379 A1 | 1/2009 | Baeza et al. |
| 2009/0003446 A1 | 1/2009 | Wu et al. |
| 2009/0003447 A1 | 1/2009 | Christoffersen et al. |
| 2009/0003451 A1 | 1/2009 | Lin et al. |
| 2009/0010337 A1* | 1/2009 | Wang ....................... 375/240.16 |
| 2009/0010338 A1* | 1/2009 | Wang ....................... 375/240.16 |
| 2009/0109988 A1 | 4/2009 | Musunuri et al. |
| 2009/0147859 A1 | 6/2009 | McGowan et al. |
| 2009/0175548 A1 | 7/2009 | Fukuhara et al. |
| 2010/0008418 A1 | 1/2010 | Wu et al. |
| 2010/0061643 A1 | 3/2010 | Fukuhara et al. |
| 2010/0158135 A1 | 6/2010 | Yin et al. |
| 2010/0189182 A1 | 7/2010 | Hannuksela |
| 2010/0195721 A1 | 8/2010 | Wu et al. |
| 2011/0295820 A1 | 12/2011 | Volkoff et al. |
| 2012/0054463 A1 | 3/2012 | Poyarekar |

FOREIGN PATENT DOCUMENTS

| | | |
|---|---|---|
| CN | 101051465 | 10/2007 |
| CN | 101313585 | 11/2008 |
| CN | 101569170 | 10/2009 |
| EP | 0 909 094 | 4/1999 |
| EP | 1 195 992 | 4/2002 |
| WO | WO 2006/096612 | 9/2006 |
| WO | WO 2006/134110 | 12/2006 |

OTHER PUBLICATIONS

3rd Generation Partnership Project, "Multimedia telephony over IP Multimedia Subsystem (IMS); Optimization opportunities (Release 7)," 3GPP Technical Report TR 26.914 V7.0.0, 18 pp. (Mar. 2006).
Akramullah et al., "Parallelization of MPEG-2 Video Encoder for Parallel and Distributed Computing Systems," *IEEE*, pp. 834-837 (Aug. 1995).
ATI Technologies, Inc., "Introduction to H.264," 6 pp. (month unknown, 2005).
Azevedo et al., "A Highly Scalable Parallel Implementation of H.264," Transactions on High-Performance Embedded Architectures and Compilers, 25 pp. (Sep. 2009).
Chen et al., "Implementation of H.264 Encoder and Decoder on Personal Computers," *Journal of Visual Comm. and Image Representation*, 19 pp. (Apr. 2006).
Chen, "Synchronization and Control of Multi-threads for MPEG-4 Video Decoder," *IEEE 1999 Int'l Conf. on Consumer Electronics*, pp. 298-299 (Jun. 1999).
Dawson, "Coding for Multiple Cores on Xbox 360 and Microsoft

(56) References Cited

OTHER PUBLICATIONS

Windows," 8 pp. (Aug. 2006) [Downloaded from the Internet on Jan. 22, 2007].
De Neve et al., "Real-Time BSD-driven Adaptation Along the Temporal Axis of H.264/AVC Bitstreams," *Advances in Multimedia Information Processing*, pp. 131-140 (2006).
Duffy, "CLR Inside Out: Using Concurrency for Scalability," MSDN Magazine, 11 pp. (Sep. 2006) [Downloaded from the Internet on Jan. 22, 2007].
Foldoc.org, "priority scheduling," 1 p. (No date) [Downloaded from the Internet on Jan. 26, 2007].
Foldoc.org, "multitasking," 1 p. (Document dated Apr. 24, 1998) [Downloaded from the Internet on Jan. 26, 2007].
Gerber et al., "Optimizing Video Encoding using Threads and Parallelism: Part 1—Threading a video codec," 3 pp., downloaded from Embedded.com, (Dec. 2009).
Huang et al., "Joint Algorithm/Code-Level Optimization of H.264 Video Decoder for Mobile Multimedia Applications," ICASSP, pp. 2189-2192 (Mar. 2008).
Intel Corp., "Intel's Next Generation Integrated Graphics Architecture—Intel® Graphics Media Accelerator X3000 and 3000," 14 pp. (Jul. 2006).
ISO/IEC, "Text of ISO/IEC 14496-10:2005/FPDAM3 Scalable Video Coding (in Integrated Form with ISO/IEC 14996-10)," ISO/IEC JTC 1/SC 29/WG 11 N8241, 552 pp. (Jul. 2006).
ITU, "Advanced video coding for generic audiovisual services," Recommendation ITU-T H.264, 676 pp. (Mar. 2010).
Jacobs et al., "Thread-Parallel MPEG-2, MPEG-4 and H.264 Video Encoders for SoC Multi-Processor Architectures," *IEEE Trans. on Consumer Electronics*, vol. 52, No. 1, pp. 269-275 (Feb. 2006).
Joint Collaborative Team on Video Coding, "Description of video coding technology proposal by Texas Instruments Inc.," JCTVC-A101, 45 pp. (Apr. 2010).
Kim et al., "Multi-thread VLIW processor architecture for HDTV decoding," *IEEE 2000 Custom Integrated Circuits Conf.*, pp. 559-562 (May 2000).
Loomis et al., "VC-1 Technical Overview," 7 pp. (Apr. 2006) [Downloaded from the Internet on Jan. 24, 2007].
MainConcept, "MainConcept™ Showcase 2.8," 4 pp. (downloaded from the World Wide Web on Apr. 6, 2011).
Murata et al., "Fast 2D IDCT Implementation with Multimedia Instructions for a Software MPEG2 Decoder," *Int'l Conf. on Acoustics, Speech, and Signal Processing*, vol. 5, pp. 3105-3108 (May 1998).
Narasimhan, "Contributions to Carriage of AVC in MPEG-2," ISO/IEC/JTC1/SC29/WG11, MPEG2003/m9448, 12 pp. (2003).
Oehring et al., "MPEG-2 Video Decompression on Simultaneous Multithreaded Multimedia," *Int. Conf. on Parallel Architectures and Compilation Techniques (PACT '99)*, Newport Beach, CA (Oct. 1999).
Ostermann et al., "Video Coding with H.264/AVC: Tools, Performance, and Complexity," *IEEE Circuits and Systems Magazine*, pp. 7-28 (Aug. 2004).
Prada-Rojas et al,. "Towards a Component-based Observation of MPSoC," *IEEE*, pp. 542-549 (Sep. 2009).
Richardson, H.264 and MPEG-4 Video Compression: Video Coding for Next-generation Multimedia, Chapter 6, "H.264/MPEG4 Part 10," pp. 159-223 (Aug. 2003).
Sambe et al., "High-speed Distributed Video Transcoding for Multiple Rates and Formats," *IEICE Trans on Information and Systems*, vol. E88-D, Issue 8, pp. 1923-1931 (Aug. 2005).
Schwarz et al., "Overview of the Scalable H.264/MPEG4-AVC Extension," *IEEE Int'l Conf. on Image Processing*, pp. 161-164 (Oct. 2006).
Segall et al., "Spatial Scalability Within the H.264/AVC Scalable Video Coding Extension," *IEEE Trans. on Circuits and Systems for Video Technology*, vol. 17, No. 9, pp. 1121-1135 (Sep. 2007).
SMPTE, "Proposed SMPTE Standard for Television: VC-1 Compressed Video Bitstream Format and Decoding Process," SMPTE 421M, pp. i-xx, 5-7, 23-27 (Aug. 2005).
SMPTE, "VC-1 Compressed Video Bitstream Format and Decoding Process," SMPTE 421M-2006, 493 pp. (Feb. 2006).
Sullivan, "DirectX Video Acceleration Specification for H.264/AVC Decoding," 66 pp. (Dec. 2007—updated Dec. 2010).
Sullivan et al., "DirectX Video Acceleration Specification for H.264/MPEG-4 AVC Multiview Video Coding (MVC), Including the Stereo High Profile," 17 pp. (Mar. 2011).
Sullivan et al., "Microsoft DirectX VA: Video Acceleration API/DDI," 88 pp. (2001).
Van Der Tol et al., "Mapping of MPEG-4 decoding on a flexible architecture platform," *Proceedings of the SPIE, Media Processors*, vol. 4674, 13 pp. (Jan. 2002).
Van Der Tol et al., "Mapping of H.264 decoding on a multiprocessor architecture," *Proceedings of the SPIE*, vol. 5022, pp. 707-718 (May 2003).
Wang, "H.264 Baseline Video Implementation on the CT3400 Multicore DSP," Cradle Technologies, 15 pp. (2006).
Wang, "[Mp4-tech] [H.264] output timing, bumping process, missing HRD parameters," downloaded from World Wide Web, 3 pp. (document marked May 5, 2006).
Wiegand et al., "Introduction to the Special Issue on Scalable Video Coding—Standardization and Beyond," *IEEE Trans. on Circuits and Systems for Video Technology*, vol. 17, No. 9, pp. 1099-1102 (Sep. 2007).
Yadav et al., "Software-only Multiple Variable Length Decoding for Real-Time Video on MDSP," *Int'l Conf. on Consumer Electronics*, pp. 141-142 (Jan. 2005).

* cited by examiner

Figure 1, prior art
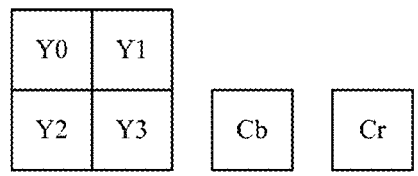
Figure 2A, prior art
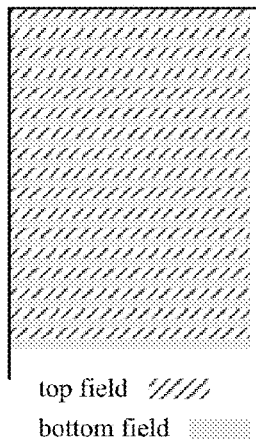
Figure 2B, prior art
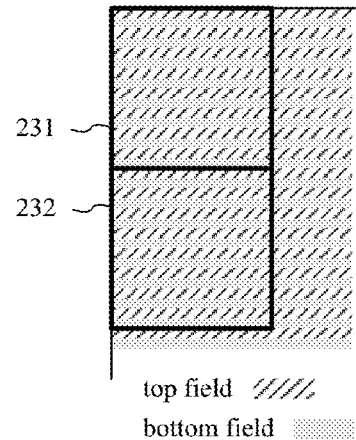
Figure 2C, prior art
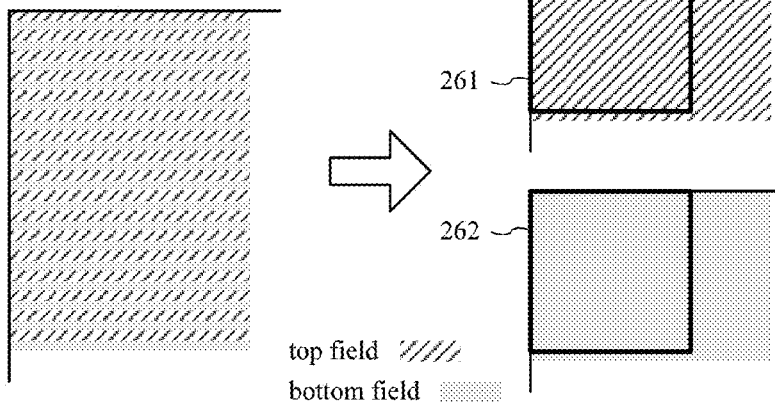

Figure 3, prior art
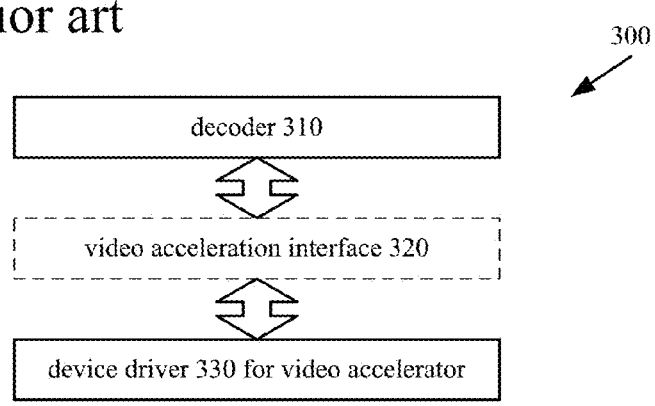
Figure 4
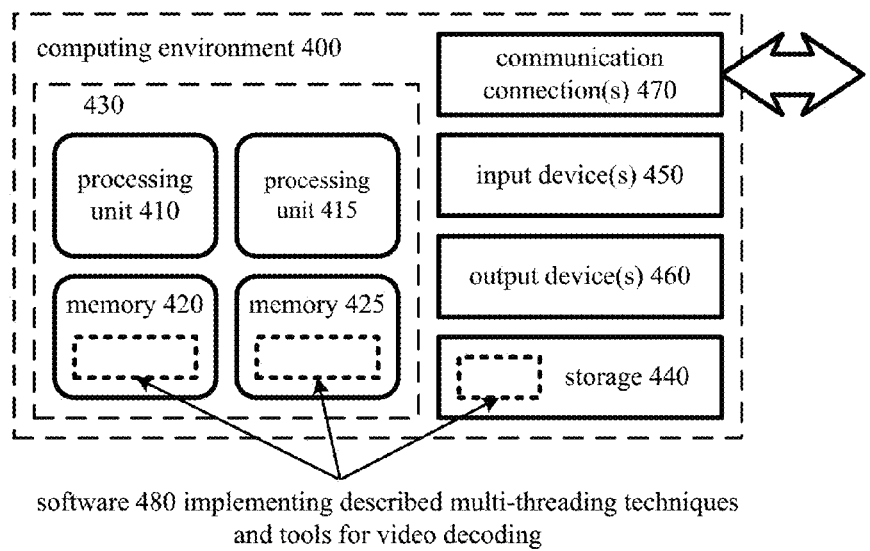
Figure 7
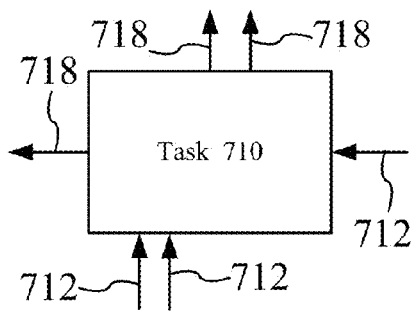

Figure 17

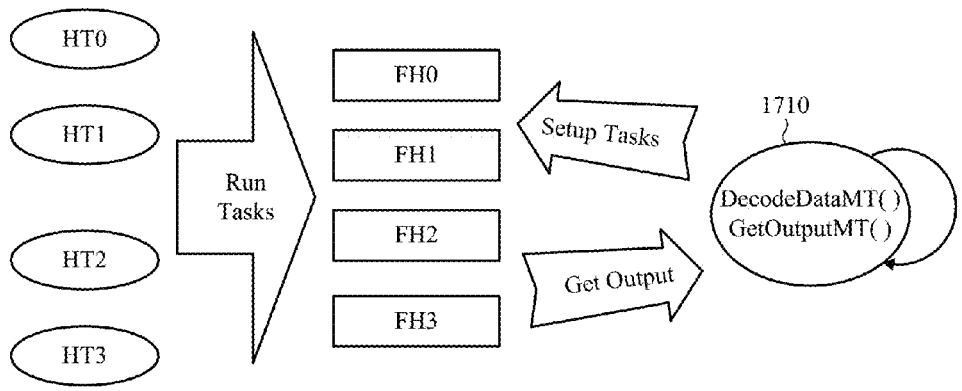

Figure 18

```
Typedef struct
{
        Enum taskType;   //CoefDec, MC, IDCT, INTRA, LF
        WMVDecoder * pWMVDec;  //back pointer to the FH structure.
        Int (*fn) ( WMVDecoder * pWMVDec);   //The execution function for this task;
                                        //Note it takes a pWMVDec as the input,
                                        //so it can be one of the pass functions
                                        // in a single-thread implementation.
        List dependOn;    // list of tasks this task depend on (outgoing arrows)
        List dependedBy;  // list of tasks depending on this task (incoming arrows);
}
Task;

Typedef struct
{
// original WMVDec stuff
   Task task[5*NUM_SEGMENTS];
}
WMVDecoder;
```

Figure 19

```
Task *Scheduler(WMVDecCtl * pFrameHolderCtl, Task * pTask)
{
    Int iCountNewTaskAddedToReadyQ = 0;
    Lock(pFrameHolderCtl);
    While(pDependedByTask = GetNextDependedByTask(pTask)) // walk thru the
                                                          // DependedBy list
    {
        RemoveDependOnLink(pDependedByTask, pTask);  // remove pTask from
                                                     // pDependedByTask's
                                                     // dependedOn list
        if(NoMoreDependedOnLink(pDependedByTask))  // if this is the last link
                                                   // in its dependOn list
        {
            AddToReadyQ(pFrameHolderCtl, pDependedByTask);  // add it to readyQ
                                                            //- this is scheduling
            iCountNewTaskAddedToReadyQ++;
        }
    } if(iCountNewTaskAddedToReadyQ > 1 &&AreThreadsSleeping(pFrameHolderCtl))
    {
        // we have added more than 1 task onto the readyQ now, and there are other
        // threads sleeping now, we need to wake them. Note if there is only 1 task
        // added, then we can take on this task and no need to wake others up.
        WakeupSleepingThreads (pFrameHolderCtl);
    }
    pTask = RemoveTopTaskInReadyQ(pFrameHolderCtl);  // return and remove the
                                                     // top priority task from
                                                     // the readyQ
    Unlock(pFrameHolderCtl);
    return pTask;
}
```

Figure 20

```
Void thread(int iThreadHandle)
{
    Task * pTask = NULL;
    While(!IsEndOfTheStream(pFrameHolderCtl)) // exit when done
    {
        // pTask is the current task just completed
        pTask = Scheduler(pFrameHolderCtl, pTask);  // call scheduler to synchronize
                                                    // current task and get next task to
                                                    // run
        If(pTask == NULL) // no more task to run for now. So the readyQ must be empty
        {
            Sleep(pFrameHolderCtl, iThreadHandle);  //will get wake up when other threads
                                                    //add tasks to the readyQ.
            continue;  //go try to get the next task
        } pTask->fn(pTask->pWMVDec);  // run the task
    }
}
```

Figure 21A

```
// This implements a simple scheme of raster scan ordering
Static Int64 Priority(WMVDecCtl * pFrameHolderCtl, Task * pTask)
{
    Return pTask->pWMVDec->m_t *MAXNUM_TASK_TYPE + pTask->taskType;
}

//Insert this pTask to the global ReadyQ via proper scheduling ordering
Void AddToReadyQ(WMVDecCtl * pFrameHolderCtl, Task * pTask)
{
    // get the global priority now
    Int64 iPriority = Priority(pFrameHolderCtl, pTask);
    // insert the pTask with the key iPriority;
    InsertBefore(pFrameHolderCtl ->ReadyQ, pTask, iPriority);
}

//remove the head of the ReadyQ
Task * RemoveTopTaskInReadyQ(WMVDecCtl * pFrameHolderCtl)
{
    Return RemoveHead(pFrameHolderCtl ->ReadyQ);
}
```

```
//this routine sets up the initial tasks for a new frame.
Void SetupTasks(WMVDecCtl * pFrameHolderCtl, WMVDec * pWMVDec)
{
    // First, we setup the intra frame dependency – no need to lock as tasks from a new
    // frame are still "offline" to the rest of the task world.
    //task0 – coef decoder task – no dependency
    pTask = &pWMVDec->task[COEFDEC]; //task0
    pTask->taskType = COEFDEC; //coef decoding
    pTask->fn = wmvdec_pass0;

//only do task1 and task2 for P and B frames
    If(pWMVDec->tFrmType != 1 )
    {
        //task1 –MC task
        pTask1 = &pWMVDec->task[MC];
        pTask1->taskType =MC; //MC pass
        pTask1->fn = wmvdec_pass2_1;

//set the task1 dependency to task0;
        AddDependOnTask(pTask1,pTask0); // pTask1 depends on pTask0
                                        // (forward arrow);
        AddDependedByTask(pTask0,pTask1); // pTask0 depended by pTask1
                                          // (backward arrow);
        //task2 – IDCT+adder task
        pTask2 = &pWMVDec->task[IDCT];
        pTask2->taskType =IDCT; //MC pass
        pTask2->fn = wmvdec_pass2_2;

//set the task2 dependency to task1;
        AddDependOnTask(pTask2,pTask1); // pTask2 depends on pTask1
                                        // (forward arrow);
        AddDependedByTask(pTask1,pTask2); // pTask1 depended by pTask2
                                          // (backward arrow);
    }
```

```
//task3 – intraMB task
pTask3 = &pWMVDec->task[INTRAMB];
pTask3->taskType = INTRAMB; //intraMB pass
pTask3->fn = wmvdec_passIntra;

//set the task3 dependency to task0;
AddDependOnTask(pTask3,pTask0); // pTask3 depends on pTask0 (forward arrow);
AddDependedByTask(pTask0,pTask3); // pTask0 depended by pTask3 (backward
                                  // arrow);

//task4 –LF task
pTask4 = &pWMVDec->task[LF];
pTask4->taskType =LF; // LF pass
pTask4->fn = wmvdec_loopFilter;

//set the task4 dependency to task3;
AddDependOnTask(pTask4,pTask3); //pTask4 depends on pTask3 (forward arrow);
AddDependedByTask(pTask3,pTask4); // pTask3 depended by pTask4 (backward
                                  // arrow);

//only add task2 dependency for P and B frames
If(pWMVDec->tFrmType != I )
{
    //set the task4 dependency to task2;
    AddDependOnTask(pTask4,pTask2); // pTask4 depends on pTask2 (forward
                                    // arrow);
    AddDependedByTask(pTask2,pTask4); // pTask2 depended by pTask4 (backward
                                      // arrow);
}

//For B and P, we also need to setup the inter frame dependency now
If(pWMVDec->tFrmType == I)
    iNumInterFrameDependents = 0; // I frame – no inter-frame dependency
else if(pWMVDec->tFrmType == P)
    iNumInterFrameDependents = 1; // P frame – 1 ref frame
else if(pWMVDec->tFrmType == B)
    iNumInterFrameDependents = 2; // B frame – 2 ref frames
```

```
//Since this interacts with other tasks in the rest of the task world, now we need to lock
Lock(pFrameHolderCtl);

for(iRefFrame= 0; iRefFrame < iNumInterFrameDependents; iRefFrame ++)
{
    //first we find the frame index for iRefFrame:
    //This figures out the index of the proper ref frame.
    Int iRefFrameIdx = GetRefFrameIdx(pFrameHolderCtl, pWMVDec, iRefFrame);
    If(IsThisFrameStillAlive(iRefFrameIdx)) // we only need to add the dependency
                                            // if this frame is not retired
    {
        pWMVDecRef = pFrameHolderCtl ->pFrameHolderBase + iRefFrameIdx%N;
        //task4 of the ref frame
        pTaskRef = & pWMVDecRef->task[LF];

//pTask1 depends on pTaskRef (forward arrow);
        AddDependOnTask(pTask1, pTaskRef);
        // pTaskRef depended by pTask1 (backward arrow);
        AddDependedByTask(pTaskRef,pTask1);

}
}

AddToReadyQ(pFrameHolderCtl, pTask0); // only task0 runnable, so add it to
                                       // readyQ.

If(AreThreadsSleeping(pFrameHolderCtl))
{
    // we have added 1 task onto the ready Q now, and there are other threads
    // sleeping now, we need to wake up them.
    WakeupSleepingThreads(pFrameHolderCtl);
}
UnLock(pFrameHolderCtl);

```
Int DecodeDataMT(WMVDecCtl * pFrameHolderCtl, char * pInputBuffer, int iInputSize,
                 char * pOutputBuffer, DWORD userData)
{
  Int iFHIdx = pFrameHolderCtl ->iCurrFrmCntDecData%N; // N is number of frame holders
  // get current frame holder
  WMVDec * pWMVDec = pFrameHolderCtl ->pFrameHolderBase+iFHIdx;
  If(!IsFrameHolderFree(pWMVDec)) // check if frame holder is free or not
  {
      Return RETRY; // not free, decoding too slow, this frame not taken this time.
  }
  pWMVDec->m_t = iCurrFrmCntDecData; // record frame index
  pWMVDec->pInputBuffer = pInputBuffer; // record input buffer, no streaming mode
  pWMVDec->iInputSize = iInputSize;
  // iOutputFrameStatus has 2 bits: DONE/NOTDONE bit, internal/external output frame bit
  int iOutputFrameStatus = NOT_DONE|EXTERNAL_FRAME;
  if(pOutputBuffer == NULL)
  {
      // app doesn't provide a valid output buffer, so try using our internal one
      pOutputBuffer = getInternalOutputFrame(pFrameHolderCtl);
      if(pOutputBuffer == NULL)
      {
          Return RETRY; // No more internal buffers. App must be late calling GetOutputMT
                        // Stall it for further decoding
      }
      iOutputFrameStatus |= INTERNAL_FRAME; // now frame is actually internal frame
  }
  // Allocate an entry in the pOutputBufferPool list, and initialize it as NOT_DONE,
  // and then set the output buffer and frame index pair for later GetOutputMT retrieval.
  AddToTail(pWMVDec-> pOutputBufferPool,
          pOutputBuffer, iCurrFrmCntDecData, iOutputFrameStatus);
  pFrameHolderCtl ->iCurrFrmCntDecData++; // increment count of DecodeDataMT
  FrameInit(pFrameHolderCtl, pWMVDec); // includes everything before the task1 starts
  // part below is similar to what's in scheduler call, except this thread doesn't run task at end
  SetupTasks(pFrameHolderCtl , pWMVDec); // setup task struct and its dependencies
                                         // for both intra frame and inter frame.
  return OK;
}
```

```
Int GetOutputMT(WMVDecCtl * pFrameHolderCtl, char * pExternalOutputBuffer,
                DWORD *pUserData)
{
  int iFrameIndex = pFrameHolderCtl ->iCurrFrmCntGetOutput;
  Int iFHIdx = iFrameIndex %N; // N is number of frame holders
  // get current frame holder
  WMVDec * pWMVDec = pFrameHolderCtl ->pFrameHolderBase+iFHIdx;
  // Check to see if the output frame for this frame index is completed
  FindInList(pWMVDec-> pOutputBufferPool, &pOutputBuffer, iFrameIndex, &iOutputFrameStatus);
  If(iOutputFrameStatus&DONE)
  {
    // only update output index and remove entry from list when buffer actually done.
    pFrameHolderCtl ->iCurrFrmCntGetOutput++;
    RemoveFromList(pWMVDec-> pOutputBufferPool,iFrameIndex);
    If(pExternalOutputBuffer != NULL)
    {
      If(!(iOutputFrameStatus&INTERNAL_FRAME))
      {
          Return error; //should've been using internal frame in corresponding DecodeDataMT call earlier
      }
      //App provides a valid pExternalOutputBuffer, so the pOutputBuffer must be
      // an internal buffer. Perform the memcpy to the external output
      Memcpy(pExternalOutputBuffer, pOutputBuffer, sizeofFrame);
      //re-cycle the internal frame
      returnInternalOutputFrame(pFrameHolderCtl, pOutputBuffer);
      return OK;
    }
    Else
    {
      If((iOutputFrameStatus&INTERNAL_FRAME))
      {
        Return error; //should've been using external frame in corresponding DecodeDataMT call earlier
      }
      Return OK;
    }
  }
  Else
    Return RETRY;
}
```

SCALABLE MULTI-THREAD VIDEO DECODING

CROSS REFERENCE TO RELATED APPLICATIONS

This application is a continuation of U.S. patent application Ser. No. 13/848,631, filed Mar. 21, 2013, which is a continuation of U.S. patent application Ser. No. 11/703,613, filed Feb. 6, 2007, the disclosure of which is hereby incorporated by reference.

BACKGROUND

Companies and consumers increasingly depend on computers to process, distribute, and play back high quality video content. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Compression can be lossless, in which the quality of the video does not suffer, but decreases in bit rate are limited by the inherent amount of variability (sometimes called source entropy) of the input video data. Or, compression can be lossy, in which the quality of the video suffers and the lost quality cannot be completely recovered, but achievable decreases in bit rate are more dramatic. Lossy compression is often used in conjunction with lossless compression—lossy compression establishes an approximation of information, and the lossless compression is applied to a representation of the approximation.

In general, video compression techniques include "intra-picture" (sometimes called "intra-frame" or simply "intra") compression and "inter-picture" (sometimes called "inter-frame" or simply "inter") compression. Intra-picture compression techniques compress a picture with reference to information within the picture, and inter-picture compression techniques compress a picture with reference to a preceding and/or following picture or pictures (often called reference or anchor pictures).

For intra-picture compression, for example, an encoder splits a picture into 8×8 blocks of samples, where a sample is a number that represents the intensity of brightness or the intensity of a color component for a small, elementary region of the picture, and the samples of the picture are organized as arrays or planes. The encoder applies a frequency transform to individual blocks. The frequency transform converts an 8×8 block of samples into an 8×8 block of transform coefficients. The encoder quantizes the transform coefficients, which may result in lossy compression. For lossless compression, the encoder entropy codes the quantized transform coefficients.

Inter-picture compression techniques often use motion estimation and motion compensation to reduce bit rate by exploiting temporal redundancy in a video sequence. Motion estimation is a process for estimating motion between pictures. For example, for an 8×8 block of samples or other unit of the current picture, the encoder attempts to find a match of the same size in a search area in another picture, the reference picture. Within the search area, the encoder compares the current unit to various candidates in order to find a candidate that is a good match. When the encoder finds an exact or "close enough" match, the encoder parameterizes the change in position between the current and candidate units as motion data (such as a motion vector ("MV")). In general, motion compensation is a process of reconstructing pictures from reference picture(s) using motion data.

The example encoder also computes the sample-by-sample difference between the original current unit and its motion-compensated prediction to determine a residual (also called a prediction residual or error signal). The encoder then applies a frequency transform to the residual, resulting in transform coefficients. The encoder quantizes the transform coefficients and entropy codes the quantized transform coefficients.

If an intra-compressed picture or motion-predicted picture is used as a reference picture for subsequent motion compensation, the encoder reconstructs the picture. A decoder also reconstructs pictures during decoding, and it uses some of the reconstructed pictures as reference pictures in motion compensation. For example, for an 8×8 block of samples of an intra-compressed picture, an example decoder reconstructs a block of quantized transform coefficients. The example decoder and encoder perform inverse quantization and an inverse frequency transform to produce a reconstructed version of the original 8×8 block of samples.

As another example, the example decoder or encoder reconstructs an 8×8 block from a prediction residual for the block. The decoder decodes entropy-coded information representing the prediction residual. The decoder/encoder inverse quantizes and inverse frequency transforms the data, resulting in a reconstructed residual. In a separate motion compensation path, the decoder/encoder computes an 8×8 predicted block using motion vector information for displacement from a reference picture. The decoder/encoder then combines the predicted block with the reconstructed residual to form the reconstructed 8×8 block.

Quantization and other lossy processing can result in visible lines at boundaries between blocks. This might occur, for example, if adjacent blocks in a smoothly changing region of a picture (such as a sky area in an outdoor scene) are quantized to different average levels. Blocking artifacts can be especially troublesome in reference pictures that are used for motion estimation and compensation. To reduce blocking artifacts, the example encoder and decoder use "deblock" filtering to smooth boundary discontinuities between blocks in reference pictures. The filtering is "in-loop" in that it occurs inside a motion-compensation loop—the encoder and decoder perform it on reference pictures used for subsequent encoding/decoding. Deblock filtering improves the quality of motion estimation/compensation, resulting in better motion-compensated prediction and lower bitrate for prediction residuals. In-loop deblocking filtering is often referred to as "loop filtering."

I. Organization of Video Frames

In some cases, the example encoder and example decoder process video frames organized as shown in FIGS. 1, 2A, 2B and 2C. For progressive video, lines of a video frame contain samples starting from one time instant and continuing through successive lines to the bottom of the frame. An interlaced video frame consists of two scans—one for the even lines of the frame (the top field) and the other for the odd lines of the frame (the bottom field).

A progressive video frame can be divided into 16×16 macroblocks such as the macroblock (100) shown in FIG. 1. The macroblock (100) includes four 8×8 blocks (Y0 through Y3) of luma (or brightness) samples and two 8×8 blocks (Cb, Cr) of chroma (or color component) samples, which are co-located with the four luma blocks but half resolution horizontally and vertically.

FIG. 2A shows part of an interlaced video frame (200), including the alternating lines of the top field and bottom field at the top left part of the interlaced video frame (200). The two fields may represent two different time periods or they may be from the same time period. When the two fields of a frame represent different time periods, this can create jagged tooth-like features in regions of the frame where motion is present.

Therefore, interlaced video frames can be rearranged according to a field structure, with the odd lines grouped together in one field, and the even lines grouped together in another field. This arrangement, known as field coding, is useful in high-motion pictures. FIG. 2C shows the interlaced video frame (200) of FIG. 2A organized for encoding/decoding as fields (260). Each of the two fields of the interlaced video frame (200) is partitioned into macroblocks. The top field is partitioned into macroblocks such as the macroblock (261), and the bottom field is partitioned into macroblocks such as the macroblock (262). (The macroblocks can use a format as shown in FIG. 1, and the organization and placement of luma blocks and chroma blocks within the macroblocks are not shown.) In the luma plane, the macroblock (261) includes 16 lines from the top field, the macroblock (262) includes 16 lines from the bottom field, and each line is 16 samples long.

On the other hand, in stationary regions, image detail in the interlaced video frame may be more efficiently preserved without rearrangement into separate fields. Accordingly, frame coding is often used in stationary or low-motion interlaced video frames. FIG. 2B shows the interlaced video frame (200) of FIG. 2A organized for encoding/decoding as a frame (230). The interlaced video frame (200) has been partitioned into macroblocks such as the macroblocks (231) and (232), which use a format as shown in FIG. 1. In the luma plane, each macroblock (231, 232) includes 8 lines from the top field alternating with 8 lines from the bottom field for 16 lines total, and each line is 16 samples long. (The actual organization and placement of luma blocks and chroma blocks within the macroblocks (231, 232) are not shown, and in fact may vary for different encoding decisions.) Within a given macroblock, the top-field information and bottom-field information may be coded jointly or separately at any of various phases—the macroblock itself may be field coded or frame coded.

II. Acceleration of Video Decoding and Encoding

While some video decoding and encoding operations are relatively simple, others are computationally complex. For example, inverse frequency transforms, fractional sample interpolation operations for motion compensation, in-loop deblock filtering, post-processing filtering, color conversion, and video re-sizing can require extensive computation. This computational complexity can be problematic in various scenarios, such as decoding of high-quality, high-bit rate video (e.g., compressed high-definition video).

Some decoders use video acceleration to offload selected computationally intensive operations to a graphics processor. For example, in some configurations, a computer system includes a primary central processing unit ("CPU") as well as a graphics processing unit ("GPU") or other hardware specially adapted for graphics processing. A decoder uses the primary CPU as a host to control overall decoding and uses the GPU to perform simple operations that collectively require extensive computation, accomplishing video acceleration.

FIG. 3 shows a simplified software architecture (300) for video acceleration during video decoding. A video decoder (310) controls overall decoding and performs some decoding operations using a host CPU. The decoder (310) signals control information (e.g., picture parameters, macroblock parameters) and other information to a device driver (330) for a video accelerator (e.g., with GPU) across an acceleration interface (320).

The acceleration interface (320) is exposed to the decoder (310) as an application programming interface ("API"). The device driver (330) associated with the video accelerator is exposed through a device driver interface ("DDI"). In an example interaction, the decoder (310) fills a buffer with instructions and information then calls a method of an interface to alert the device driver (330) through the operating system. The buffered instructions and information, opaque to the operating system, are passed to the device driver (330) by reference, and video information is transferred to GPU memory if appropriate. While a particular implementation of the API and DDI may be tailored to a particular operating system or platform, in some cases, the API and/or DDI can be implemented for multiple different operating systems or platforms.

In some cases, the data structures and protocol used to parameterize acceleration information are conceptually separate from the mechanisms used to convey the information. In order to impose consistency in the format, organization and timing of the information passed between the decoder (310) and device driver (330), an interface specification can define a protocol for instructions and information for decoding according to a particular video decoding standard or product. The decoder (310) follows specified conventions when putting instructions and information in a buffer. The device driver (330) retrieves the buffered instructions and information according to the specified conventions and performs decoding appropriate to the standard or product. An interface specification for a specific standard or product is adapted to the particular bit stream syntax and semantics of the standard/product.

Although some prior designs have proposed mapping particular decoding operations to different processing units, such as by mapping particular decoding operations to GPUs, prior designs are limited in terms of flexibility and efficiency. For example, a design that statically determines which processing units will perform particular decoding operations is susceptible to long periods of inactivity when processing units are forced to wait for their assigned operations to begin.

SUMMARY

This Summary introduces a selection of concepts in a simplified form that are further described below in the Detailed Description. This Summary is not intended to identify key features or essential features of the claimed subject matter, nor is it intended to be used to limit the scope of the claimed subject matter.

In summary, the Detailed Description is directed to various techniques and tools for multi-threading for video coding and decoding.

In one aspect, encoded video information is received at a video decoder on a computer system comprising multiple hardware threads. For example, a computer system has multiple processing units, and each of the multiple processing units has multiple hardware threads. Decoding tasks are identified for decoding the encoded video. For example, decoding tasks include entropy decoding tasks, motion compensation tasks, inverse frequency transform tasks, inverse quantization tasks, intra decoding tasks, loop filtering tasks, and/or other tasks. Task dependencies are identified for at least one of the video decoding tasks. For example, one or more decoding tasks depend on prior completion of entropy decoding tasks. The decoding tasks are prioritized based at least in part on the task dependencies. For example, a higher priority is assigned to tasks that must be completed before other tasks that depend on them can begin. The prioritized decoding tasks are selected to be performed by the hardware threads. For example, a first hardware thread performs a first decoding task that does not depend on any uncompleted tasks, while a second hardware thread performs a second decoding task that does not depend on any uncompleted tasks.

Additional features and advantages will be made apparent from the following detailed description of various embodiments that proceeds with reference to the accompanying drawings.

BRIEF DESCRIPTION OF THE DRAWINGS

FIG. 1 is a diagram of a macroblock format according to the prior art.

FIG. 2A is a diagram of part of an interlaced video frame, FIG. 2B is a diagram of the interlaced video frame organized for encoding/decoding as a frame, and FIG. 2C is a diagram of the interlaced video frame organized for encoding/decoding as fields, according to the prior art.

FIG. 3 is a block diagram illustrating a simplified architecture for video acceleration during video decoding according to the prior art.

FIG. 4 is a block diagram illustrating a generalized example of a suitable computing environment in which several of the described embodiments may be implemented.

FIG. 7 is a diagram showing a graphic representation of a task having dependency relationships with other tasks in a described implementation.

FIG. 17 is a diagram showing functionality of an example API for multi-thread video decoding in a described implementation.

FIG. 18 is a code listing with example code showing an example task structure in a described implementation.

FIG. 19 is a code listing with example code showing an example scheduler function in a described implementation.

FIG. 20 is a code listing with example code showing an example thread function in a described implementation.

FIGS. 21A-21D are code listings with example code showing examples of priority queue manipulation functions and routines for setting up initial tasks and task dependencies for new pictures in a described implementation.

FIGS. 22A and 22B are code listings with example code showing an example of an API for performing multi-threaded video decoding in a described implementation.

DETAILED DESCRIPTION

Figure 5:
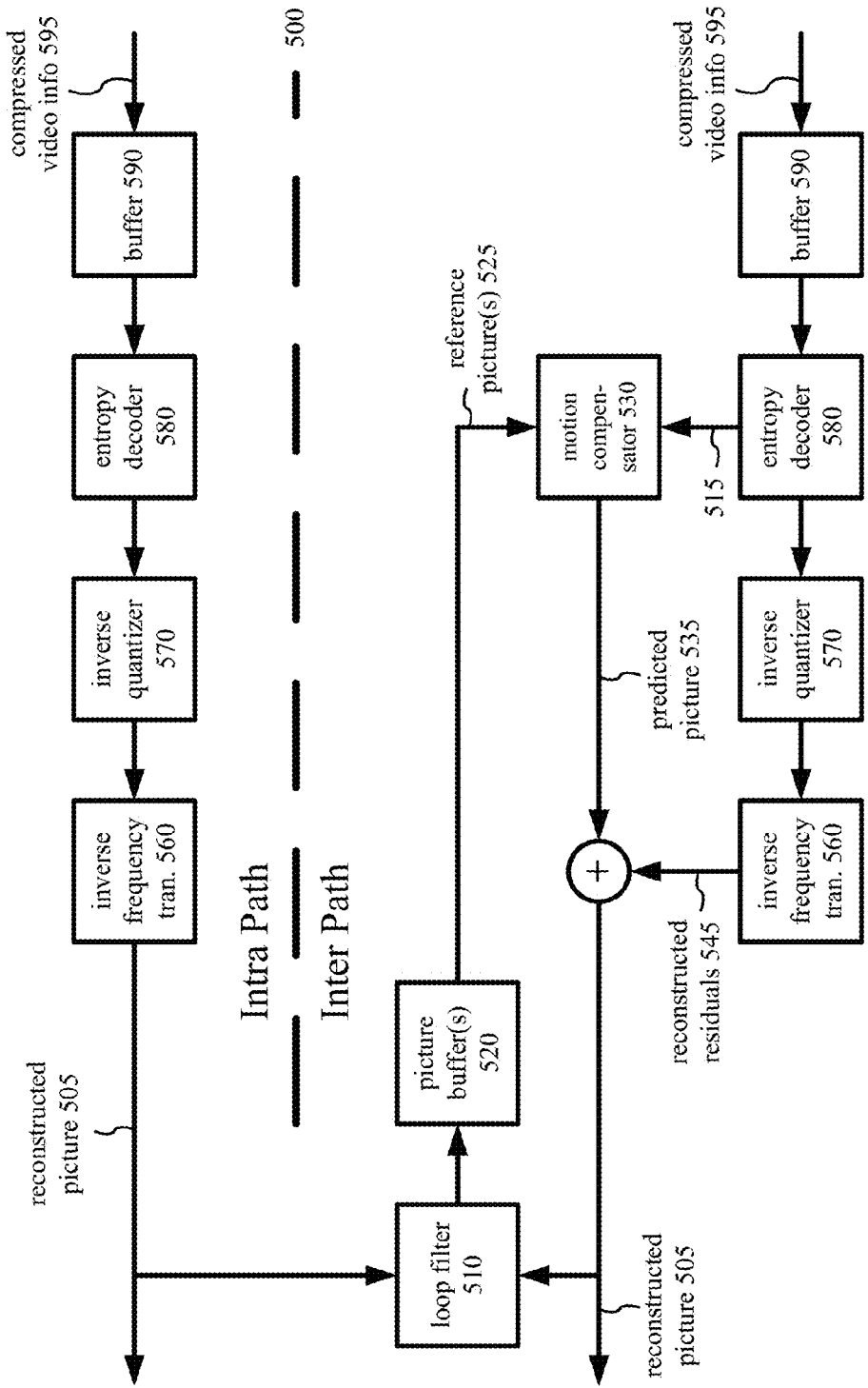
FIG. 5 is a block diagram of a generalized video decoder in conjunction with which several of the described embodiments may be implemented.

Techniques and tools for multi-threaded video processing are described herein.

Various alternatives to the implementations described herein are possible. For example, certain techniques described with reference to flowchart diagrams can be altered by changing the ordering of stages shown in the flowcharts, by repeating or omitting certain stages, etc., while achieving the same result. As another example, although some implementations are described with reference to specific macroblock formats, other formats also can be used. As another example, described video decoding techniques can be applied to decoding of other kinds of encoded information where the decoding can be divided into interdependent decoding tasks, such as audio information. Different embodiments implement one or more of the described techniques and tools. Some of the techniques and tools described herein address one or more of the problems noted in the Background. Typically, a given technique/tool does not solve all such problems, however.

I. Computing Environment

FIG. 4 illustrates a generalized example of a suitable computing environment (400) in which several of the described embodiments may be implemented. The computing environment (400) is not intended to suggest any limitation as to scope of use or functionality, as the techniques and tools may be implemented in diverse general-purpose or special-purpose computing environments.

With reference to FIG. 4, the computing environment (400) includes at least two processing units (410, 415) and associated memory (420, 425). The processing units (410, 415) may include a GPU or other co-processing unit for video acceleration. In FIG. 4, this most basic configuration (430) is included within a dashed line. The processing unit (410) executes computer-executable instructions and may be a real or a virtual processor. In a multi-processing system, multiple processing units execute computer-executable instructions to increase processing power. A host encoder or decoder process uses available processing units (410, 415) to perform decoding operations. Certain operations (e.g., in-loop deblock filtering) may be performed by a specialized processing unit such as a GPU. The memory (420, 425) may be volatile memory (e.g., registers, cache, RAM), non-volatile memory (e.g., ROM, EEPROM, flash memory, etc.), or some combination of the two. The memory (420, 425) may be specific to one processor or shared by two or more processors. The memory (420, 425) stores software (480) for an encoder and/or decoder implementing multi-threaded video decoding.

A computing environment may have additional features. For example, the computing environment (400) includes storage (440), one or more input devices (450), one or more output devices (460), and one or more communication connections (470). An interconnection mechanism (not shown)

such as a bus, controller, or network interconnects the components of the computing environment (400). Typically, operating system software (not shown) provides an operating environment for other software executing in the computing environment (400), and coordinates activities of the components of the computing environment (400).

The storage (440) may be removable or non-removable, and includes magnetic disks, magnetic tapes or cassettes, CD-ROMs, DVDs, or any other medium which can be used to store information and which can be accessed within the computing environment (400). The storage (440) stores instructions for the software (480).

The input device(s) (450) may be a touch input device such as a keyboard, mouse, pen, touch screen, or trackball, a voice input device, a scanning device, or another device that provides input to the computing environment (400). For audio or video encoding, the input device(s) (450) may be a sound card, video card, TV tuner card, or similar device that accepts audio or video input in analog or digital form, or a DVD, CD-ROM or CD-RW that reads audio or video samples into the computing environment (400). The output device(s) (460) may be a display, printer, speaker, CD- or DVD-writer, or another device that provides output from the computing environment (400).

The communication connection(s) (470) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (400), computer-readable media include memory (420), storage (440), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "check" and "select" to describe computer operations in a computing environment. These terms are high-level abstractions for operations performed by a computer, and should not be confused with acts performed by a human being. The actual computer operations corresponding to these terms vary depending on implementation.

II. Generalized Video Decoder

FIG. 5 is a block diagram of a generalized video decoder (500) in conjunction with which several described embodiments may be implemented. A corresponding video encoder (not shown) may also implement one or more of the described embodiments.

The relationships shown between modules within the decoder (500) indicate general flows of information in the decoder; other relationships are not shown for the sake of simplicity. In particular, some operations of modules of the decoder (500) depend on other operations being completed first. Such dependencies can vary depending on implementation and are described in more detail below.

A video accelerator can be used to perform operations such as inverse frequency transforms, fractional sample interpolation, motion compensation, in-loop deblocking filtering, color conversion, post-processing filtering and/or picture resizing. For example, the decoder (500) passes instructions and information to the video accelerator as described in "Microsoft DirectX VA: Video Acceleration API/DDI," version 1.01. Alternatively, the decoder (500) passes instructions and information to the video accelerator using another mechanism, such as one described in a later version of DXVA or another acceleration interface. In some implementations, different video acceleration profiles result in different operations being performed by different hardware threads.

Returning to FIG. 5, the decoder (500) processes video pictures, which may be video frames, video fields or combinations of frames and fields. The bitstream syntax and semantics at the picture and macroblock levels may depend on whether frames or fields are used. The decoder (500) is block-based and uses a 4:2:0 macroblock format for frames. For fields, the same or a different macroblock organization and format may be used. 8×8 blocks may be further sub-divided at different stages. Alternatively, the decoder (500) uses a different macroblock or block format, or performs operations on sets of samples of different size or configuration.

The decoder (500) receives information (595) for a compressed sequence of video pictures and produces output including a reconstructed picture (505) (e.g., progressive video frame, interlaced video frame, or field of an interlaced video frame). The decoder system (500) decompresses predicted pictures and key pictures. For the sake of presentation, FIG. 5 shows a path for key pictures through the decoder system (500) and a path for predicted pictures. Many of the components of the decoder system (500) are used for decompressing both key pictures and predicted pictures. The exact operations performed by those components can vary depending on the type of information being decompressed.

A demultiplexer and buffer (590) receives the information (595) for the compressed video sequence and makes the received information available to the entropy decoder (580). The entropy decoder (580) entropy decodes entropy-coded quantized data as well as entropy-coded side information, typically applying the inverse of entropy encoding performed in the encoder. A motion compensator (530) applies motion information (515) to one or more reference pictures (525) to form motion-compensated predictions (535) of subblocks, blocks and/or macroblocks of the picture (505) being reconstructed. One or more picture stores store previously reconstructed pictures for use as reference pictures.

The decoder (500) also reconstructs prediction residuals. An inverse quantizer (570) inverse quantizes entropy-decoded data. An inverse frequency transformer (560) converts the quantized, frequency domain data into spatial domain video information. For example, the inverse frequency transformer (560) applies an inverse block transform to subblocks and/or blocks of the frequency transform coefficients, producing sample data or prediction residual data for key pictures or predicted pictures, respectively. The inverse frequency transformer (560) may apply an 8×8, 8×4, 4×8, 4×4, or other size inverse frequency transform.

For a predicted picture, the decoder (500) combines reconstructed prediction residuals (545) with motion compensated predictions (535) to form the reconstructed picture (505). A motion compensation loop in the video decoder (500) includes an adaptive deblocking filter (510). The decoder (500) applies in-loop filtering (510) to the reconstructed picture to adaptively smooth discontinuities across block/sub-block boundary rows and/or columns in the picture. The decoder stores the reconstructed picture in a picture buffer (520) for use as a possible reference picture. For example, the decoder (500) performs in-loop deblock filtering operations.

Depending on implementation and the type of compression desired, modules of the decoder can be added, omitted, split into multiple modules, combined with other modules, and/or replaced with like modules. In alternative embodiments, encoders or decoders with different modules and/or other configurations of modules perform one or more of the described techniques. Specific embodiments of video decoders typically use a variation or supplemented version of the generalized decoder (500).

III. Scalable Multi-Thread Video Decoding

The number of processing cores available to computing systems grows nearly every year. For example, Intel Corporation has announced plans for a 32-core processor (with 128 hardware threads) in the next 5 years. At the same time, decoding of high-quality video such as high-definition ("HD") video demands increasing amounts of processing power. To take advantage of the increasing number of available hardware threads, scalable multi-thread video decoding techniques and tools are described.

Various described techniques and tools facilitate multi-thread decoding of video by breaking decoding into tasks that can be performed with different threads. Described techniques and tools allow complex video decoding to be performed flexibly and efficiently, with the ability to scale up to multi-thread processing or down to single-thread processing depending on the type of hardware being used and/or the type of decoding being performed. For example, when decoding video that has been encoded according to a particular video codec standard, described multi-thread video decoding tools can be adjusted to allow more or fewer hardware threads to perform decoding tasks to meet hardware constraints, usage constraints, or other criteria.

A decoding task for a current picture may depend on one or more other decoding tasks for the current picture and/or, one or more other pictures. Preliminary analysis of task dependencies is performed, and the dependencies are updated during decoding to allow accurate determination of which tasks are currently "runnable." A task is considered to be runnable, for example, if its completion does not depend on any other uncompleted task. Different kinds of encoded video may have different combinations of task dependencies, and some of the described multi-thread video decoding tools can be used to identify different kinds of task dependencies and prioritize tasks accordingly. For example, when decoding video that has been encoded according to a particular video codec standard, some of the described multi-thread video decoding tools can determine task dependencies and task priorities particular to that standard.

Described techniques and tools allow decoding tasks to be performed in an efficient way while reducing wait time for processing units. For example, available threads perform tasks based on the relative priority of these tasks, as reflected in data structures such as priority queues.

Available hardware threads perform runnable tasks. The available threads generally are not limited to performing particular kinds of tasks (i.e., particular decoding operations) or to performing tasks for particular pictures. In some cases, however, specialized processors such as GPUs are limited in the kinds of tasks they can perform.

Some example techniques and tools are described with reference to a currently available multi-core system—the Xbox 360™ game console available from Microsoft Corporation—which has three cores running at 3.2 GHz with two hardware threads on each core, and one graphics processor running at 500 MHz. However, it should be understood that the examples described herein are adaptable to other platforms/scenarios with some modifications. For example, described techniques and tools have achieved near linear scalability with up to 8 cores for HD video content.

In general, the term "thread" as used herein can mean a hardware thread (HT) bound or otherwise associated with a particular hardware core (e.g., for a specific hardware configuration such as the Xbox 360™) or a generic software thread.

A. Decoding Stages and Data Flow

Figure 6:
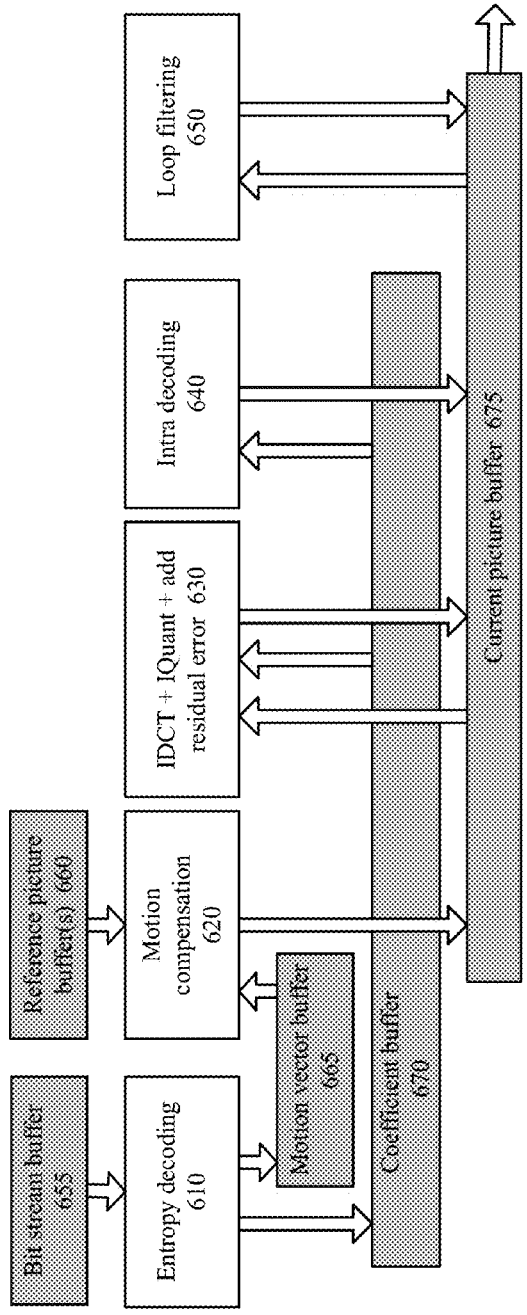
FIG. 6 is a block diagram showing data flow in an example single-thread video decoding process for a video picture in a described implementation.

FIG. 6 is a block diagram showing data flow in an example video decoding process for a video picture. The video decoding process can be performed by a single thread or by more than one thread. The decoding process shown in FIG. 6 is for an inter-coded picture (e.g., a progressive P-frame) and includes five "passes" or stages, including entropy decoding (610) (which includes coefficient decoding and motion vector decoding), motion compensation (620), inverse frequency transform (in this example, inverse discrete cosine transform ("IDCT")) with inverse quantization ("IQuant") and addition of residual error (630), intra decoding (640) for intra-coded portions of the inter-coded picture, and loop filtering (650).

FIG. 6 also shows 5 kinds of buffers: bitstream buffer (655), reference picture buffer(s) (660), motion vector buffer (665), coefficient buffer (670), and current picture buffer (675). Arrows generally indicate direction of data flow between decoding stages and buffers.

Alternatively, decoding processes can be divided into more or fewer stages and more or fewer buffers can be used. For example, a separate inverse quantization stage may be included along with the stages shown in FIG. 6. Or, various stages may be combined into a smaller number of stages. For some picture types and/or decoder configurations, some of the stages shown in FIG. 6 are not present. For example, for a progressive I-frame the motion compensation stage is not present.

B. Tasks

Sometimes, a set of operations on a picture or portion of a picture can be performed by a single thread as a task. A decoding process on a single picture comprises a number of tasks. Tasks are considered to be non-overlapping when they belong to different stages or involve different portions of the picture.

Depending on the nature of the decoding stage and the encoding of the picture, decoding stages can be serial or parallel. For pictures with slices, which are considered to be independently decodable for entropy decoding, entropy decoding (610) is a parallel process because more than one instance of coefficient decoding can be performed at the same time on different individual slices of a single picture. For pictures without slices, entropy decoding (610) is essentially a serial process because it is complicated (or even impossible) to perform more than one instance of coefficient decoding at the same time on a single picture. For other stages, however, it is easier to segment the picture (with or without slices) such that more than one instance of the corresponding decoding operation can be performed at a time on different segments of the picture as long as the segments are non-overlapping. Such stages include motion compensation (620) and inverse frequency transform (630). Segmentation also can be used to split up serial processes into smaller tasks, but the segments are processed from top to bottom, one at a time. Intra decoding (640) is typically a serial process, whereas loop filtering (650) could be a parallel process in some cases.

The ordering and relationships shown in FIG. 6 can be varied depending on implementation. For example, it is possible to move the addition of residual error from the inverse frequency transform (IDCT) stage (630) to the motion compensation stage (620), and perform IDCT ahead of motion compensation. In one implementation, this reordering requires a bigger buffer for the IDCT results (twice the size as we move from calculations involving pixelc (one byte) to calculations involving pixelI (two bytes)). However, this may be useful to consider for a segment-based multi-threading scheme, which is described in further detail below.

C. Frame Holders

In some embodiments, a decoding process for an individual picture can take place using a data structure called a working frame holder ("WFH"). Generally speaking, a WFH is a place in memory where picture decoding develops throughout its several decoding stages. A non-working frame holder ("NWFH") is a WFH in its unused state, without a current picture buffer. Though referred to herein as "frame" holders, it should be understood that fields of frames also can be held and/or processed in frame holders.

A NWFH becomes a WFH when picture decoding begins. A current picture buffer is attached to the WFH, and after the picture decoding is completed the current picture buffer is detached, converting the WFH back to a NWFH again. In a single-threading scenario, only one picture is decoded at a time, and so only one frame holder is present. However, additional frame holders play an important role in multi-thread design in these embodiments.

The state of the WFH is updated based on decoding results. For example, before the decoding of a current picture, the current state of the WFH is updated based on decoding results of previous picture(s) to set up reference pictures for the decoding of the current picture. In turn, the current picture may be a reference picture for subsequent inter-coded pictures.

The number of frame holders used can vary depending on implementation. For example, in a system having plural hardware threads, it is preferable to have at least one frame holder for each hardware thread to allow each thread to perform decoding operations on a different picture simultaneously. However, the utility of additional frame holders is balanced with the use of memory resources by the additional frame holders.

In one implementation, a WFH is an instance of a main decoder data structure consisting of I/O buffers described above (with respect to FIG. 6) as well as other member fields used by the decoding process (e.g., a pWMVDec structure).

D. Task Dependency

The data flow shown in the FIG. 6 suggests dependency relationships among the decoding stages, in the sense that some stages cannot proceed until their respective input data are fully available. Dependency relationships are important properties of tasks.

A task that cannot start to run until another task has been completed is dependent on the other task. FIG. 7 shows a graphic representation of a task (710) having dependency relationships with other tasks (not shown). The incoming arrows (712) represent other tasks that depend on the task (710), and the outgoing arrows (718) represent other tasks that the task (710) depends on. A task that does not depend on any other tasks is ready to run, or "runnable."

Figure 8:
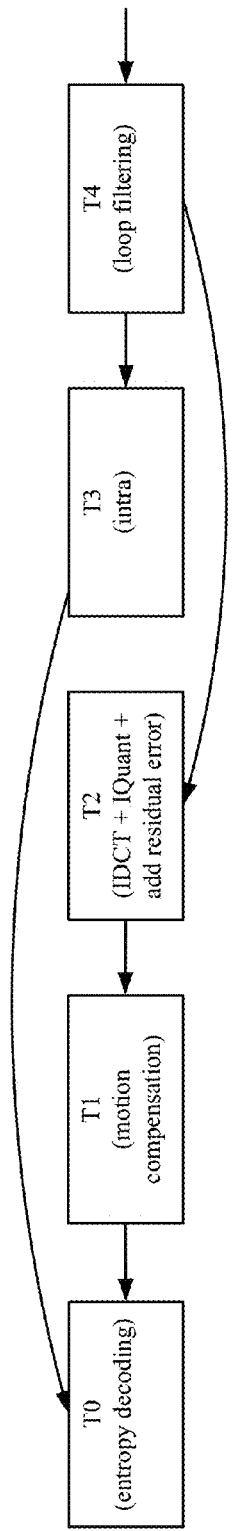
FIG. 8 is a diagram showing decoding task dependencies for a decoding process in a described implementation.

With this representation of a task, the decoding process diagram of FIG. 6 can be converted into a decoding task dependency diagram, shown in FIG. 8 for single-thread decoding. Task T0 (entropy decoding) is an independent task; the decoding of the bit stream is not dependent on any other tasks. Therefore, task T0 has no outgoing arrows. Task T1 (motion compensation) depends on the decoding of motion vectors in task T0. In reality, motion compensation also depends on the availability of reference picture(s). However, in single-thread processing, the fact that the current picture is being decoded means that any reference pictures have already been decoded. Therefore, in this representation, which shows tasks for single-thread decoding, Task T1 has just one outgoing arrow to task T0.

Task T2 depends on task T1 for the part of the task that adds residual error to motion-compensated predictions from task T1. Task T2 also depends on task T0 for the decoded coefficients for residuals, but because task T1 already depends on task T0, only one outgoing arrow is shown for task T2.

Task T3 (intra decoding) depends only on task T0 for decoded intra coefficients. (Task T3 includes its own inverse frequency transform (IDCT) calculations and so does not depend on task T2.) Task T4 (loop filtering) depends on the completion of both inter-decoding and intra-decoding tasks. Therefore, task T4 has two outgoing arrows to task T2 (the last inter-decoding task for the picture) and task T3.

In this way, a single-thread decode process can be represented as a number of non-overlapping tasks that operate using a WFH, which is updated before and after decoding of the picture. Task dependencies within individual pictures and between pictures for multi-threading and for additional decoding operations (such as color conversion) are described in detail below.

E. Multi-Thread Task-Based Decoding

In this section, multi-threaded task-based decoding is described.

A goal of multi-threaded task-based decoding is for different threads to perform simultaneous decoding using WFHs for different pictures. When properly synchronized, the tasks using different WFHs are executed in order and the task dependencies are resolved, just as if they were part of a single-thread decoding process.

In one implementation, the frame holders described above are replicated for multi-threaded task-based decoding. Specifically, a total of N frame holders are generated, each of which becomes a WFH for pictures with the same picture index. For example, for progressive frames the picture index frm_idx can be represented as:

$$frm\_idx = m\_t \% N,$$

where m_t is the current frame count in decoding order.

Figure 9:
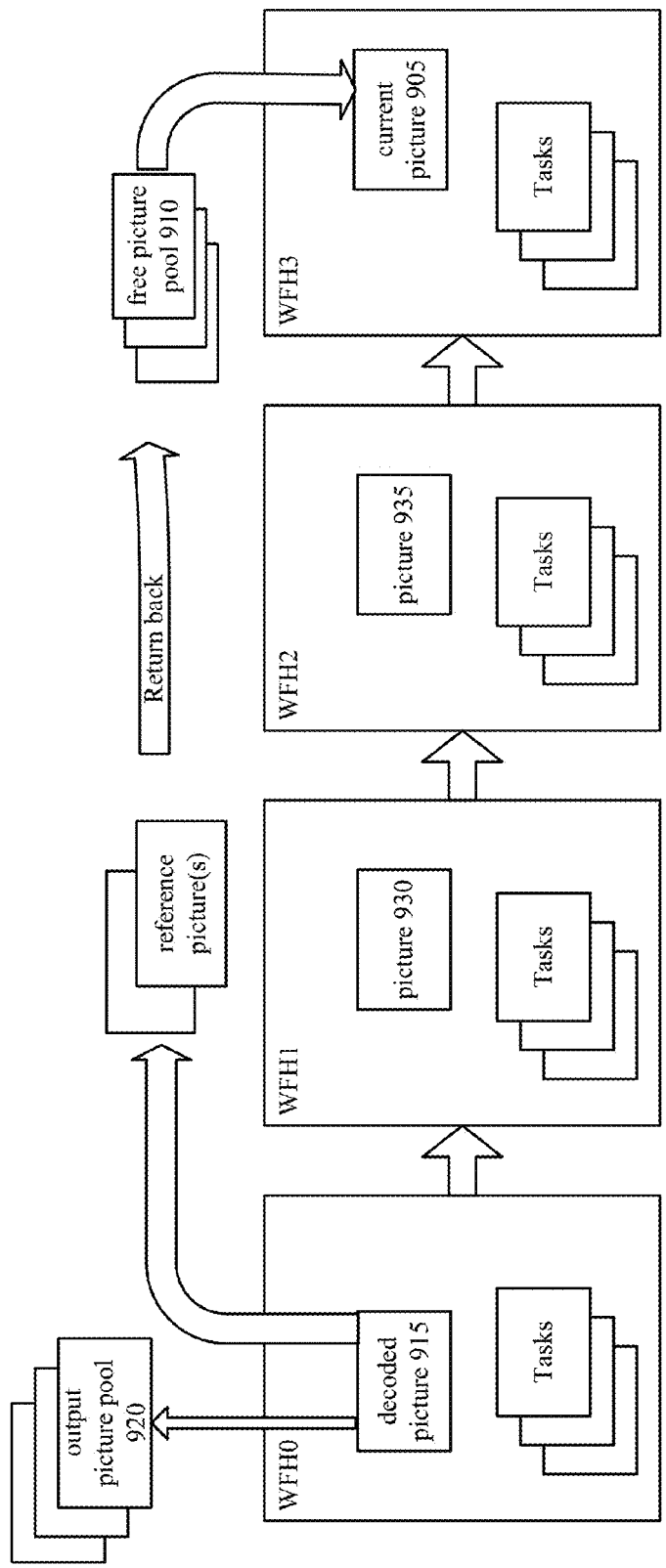
FIG. 9 is a block diagram showing data flow in a multi-thread decoding arrangement in a described implementation.

FIG. 9 is a block diagram of an example multi-thread decoding arrangement as current picture (905) is being decoded. Arrows generally indicate direction of data flow. In FIG. 9, at the start of picture decoding, a NWFH becomes a WFH (labeled WFH3 in FIG. 9) by attaching a current picture (905) obtained from a free picture pool (910). The decoding proceeds using this WFH in the same way as the single-threading case, provided that dependency requirements are met. After a picture is decoded, the decoded picture is detached from the WFH data structure. In FIG. 9, decoded picture (915) is detached from working picture holder WFH0. The decoded picture (915) is made available for post-processing, color conversion, or other operations in the output picture pool (920). The decoded picture (915) is also made available as a reference picture, and it is returned back to the free picture pool (910) when there are no more references to it. The other pictures (930, 935) are shown in intermediate stages of decoding.

Post-processing and color-conversion processes generally take decoded pictures as input and output the post-processed and/or color-converted picture to the output picture pool (920). In one implementation, this functionality is provided by a call to the function DecodeDataMT( ), which is described in further detail below, or by an internal output picture pool and later copying to an external output buffer.

F. Inter-Picture Task Dependency

FIG. 8 shows examples of dependencies between tasks for decoding an individual picture. In this section, dependencies among tasks for different pictures (e.g., progressive frames, interlace frames organized for decoding as frames, or interlace frames organized for decoding as fields) also are described.

Figure 10A:
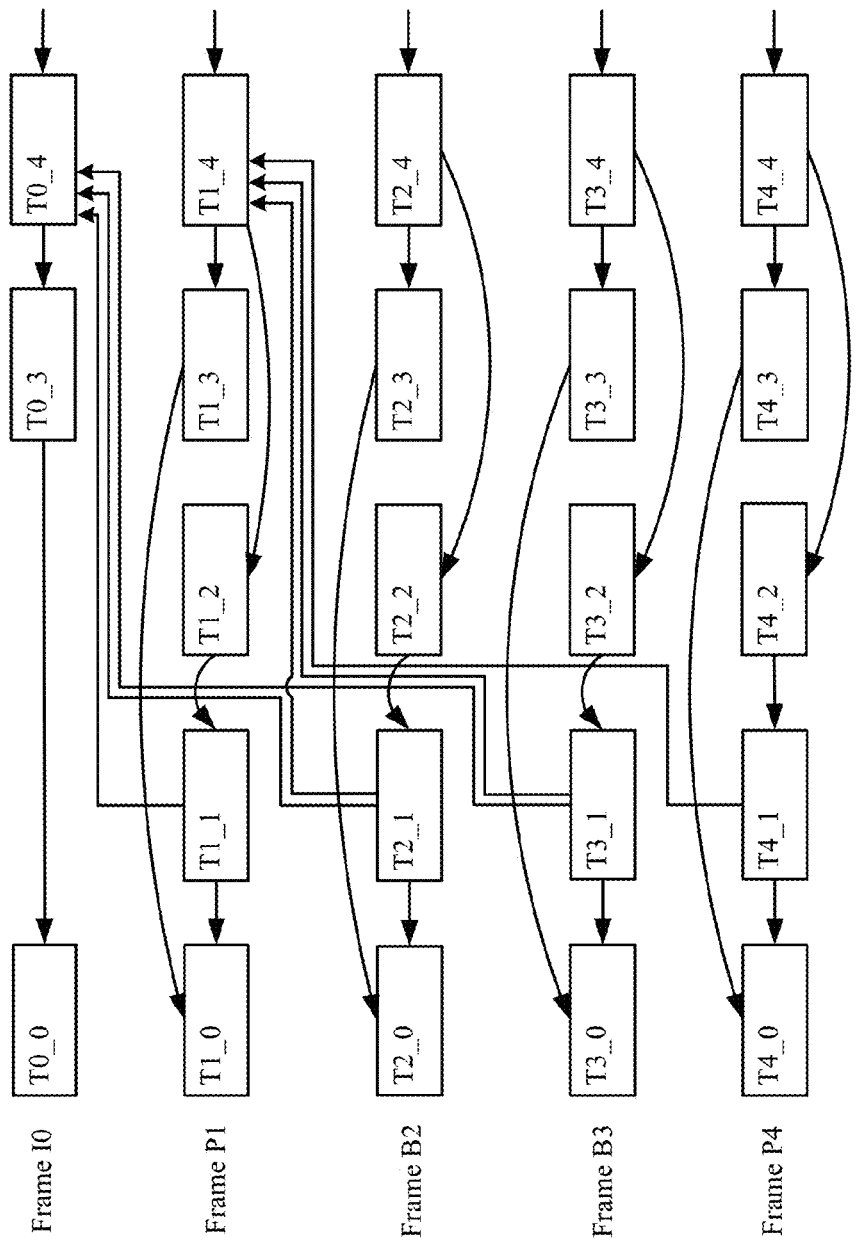
FIG. 10A is a diagram showing examples of task dependencies between five progressive video frames or interlaced video frames organized for decoding as a frame in a described implementation.

1. Inter-Picture Task Dependency for Progressive Frames or Interlaced Video Frames Organized for Decoding as Frames FIG. 10A is a diagram that shows examples of task dependencies between five progressive video frames or interlaced video frames organized for decoding as frames. The five frames are shown in coded order. Tasks for five frames (labeled I0, P1, B2, B3 and P4) are shown.

Each frame has an associated WFH and five tasks, except for the I-frame, which has three tasks. The P-frame tasks and B-frame tasks have both intra-frame dependencies (e.g., for intra-coded macroblocks) and inter-frame dependencies. The notation Ti_j indicates the jth task of the ith frame. The inter-frame dependencies are for motion compensation tasks (Ti_1) that depend on the previous frames. Although the motion compensation tasks are shown as being dependent on the completion of the loop filtering task (Ti_4) of the reference frames, the motion compensation tasks may instead depend on completion of some other task in the reference frame (e.g., if loop filtering is omitted).

Figure 10B:
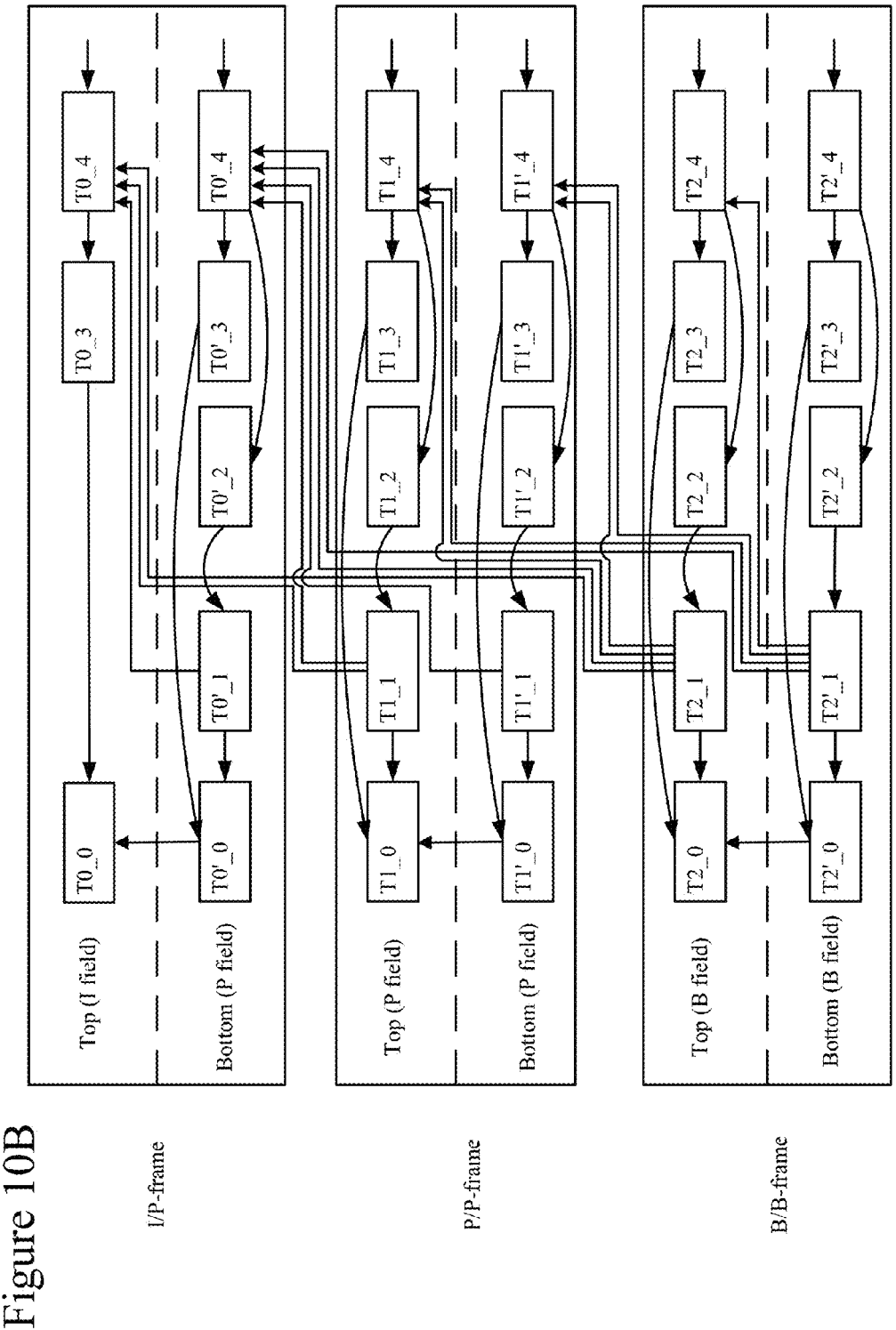
FIG. 10B is a diagram showing examples of task dependencies between three interlaced video frames organized for decoding as fields in a described implementation.

2. Inter-Picture Task Dependency for Interlaced Video Frames Organized for Decoding as Fields FIG. 10B is a diagram that shows examples of task dependencies between three interlaced video frames organized for decoding as fields. Each individual field has tasks similar to those for progressive frames. The dependencies between tasks of an individual field are analogous to the dependencies between tasks of an individual progressive frame, but dependencies between tasks of different fields (whether fields in the same frame or fields in different frames) have additional complications to be considered.

Tasks for three frames organized for decoding as fields in one implementation are shown in FIG. 10B. The frames are labeled as an I/P-frame, P/P-frame, and BB-frame, respectively, and are shown in coded order. Although the P/P-frame precedes the B/B-frame in coded order (and decoding order), the P/P-frame follows the B/B-frame in display order. For FIG. 10B, Ti_j indicates the jth task for the top field of frame I, and Ti'_j indicates the jth task for the bottom field in the ith frame.

In the example shown in FIG. 10B, the following rules apply for finding inter-field task dependencies. In a P/P-frame, the motion compensation task for each P-field (labeled as T1 for the top field and T1' for the bottom field) depends on one or two previously decoded fields, and the number of reference fields is indicated in the bitstream. In a B/B-frame, each B field has four inter-field dependencies. The top B-field (T2) refers to the first and the second fields from the previous and next anchor frames (in display order). On the other hand, the bottom B-field (T2') refers to the top B-field in the same frame, the second (bottom) field of the previous anchor frame and the first and second field of the subsequent anchor frame (in display order).

In one implementation, the task dependency rules for a P-field or B-field are independent of the type of frame they are in. For example, for a P-field, its dependency rules are the same whether it is in a P/P-frame or I/P-frame. Other possible combinations of fields in a single frame include I/I, P/I, P/P, B/BI, BI/B, and BI/BI (where a BI-field is an intra-coded B-field).

Alternatively, the rules for interlace field task dependency can be simplified. One purpose of task dependency simplification is to reduce the total number of task dependency links in the graph. One simplification is to serialize the two fields in the same frame (e.g., by making the motion compensation stage of the bottom field always depend on the loop filtering stage of the top field). In terms of task dependency, by looking above the field level to the frame level, the two fields are treated as a whole frame instead of two individual fields, and the inter-frame dependency chain becomes similar to progressive mode.

For example, within the same frame, for purposes of simplification the motion compensation task (T1'_1) for the bottom field (T1') of the P/P-frame can depend only on the loop filtering task (T1_4) of the top field (T1). Between frames, the motion compensation task (T1_1) for the top field (T1) of the P/P-frame can depend only on the loop filtering task (T0'_4) of the bottom field (T0') of its previous anchor frame (for P-fields). Similarly, the motion compensation task (T2_1) of the top field (T2) of the B/B-frame can depend only on the loop filtering tasks (T0'_4, T1'_4) of the previous and next anchor frames. This way the dependencies for the interlace field tasks will be much like the dependencies for progressive frame tasks.

As long as the frame-level dependency relationship is intact, there are many ways to simplify the intra-frame dependency. However, as dependencies between fields become simpler, less task parallelism may increase thread wait times.

G. Task Synchronization and Scheduling

A task synchronization is an operation performed at completion time for a current task. The current task is examined to identify all the other tasks depending on it, and the dependencies on the current task are removed for those other tasks. The task synchronization is typically followed by task scheduling for those tasks that used to depend on the current task but are no longer dependent on any tasks and can run immediately. These newly runnable tasks are put into a priority queue for future execution via a proper scheduling order, as described below.

1. Priority Queue

Figure 11:
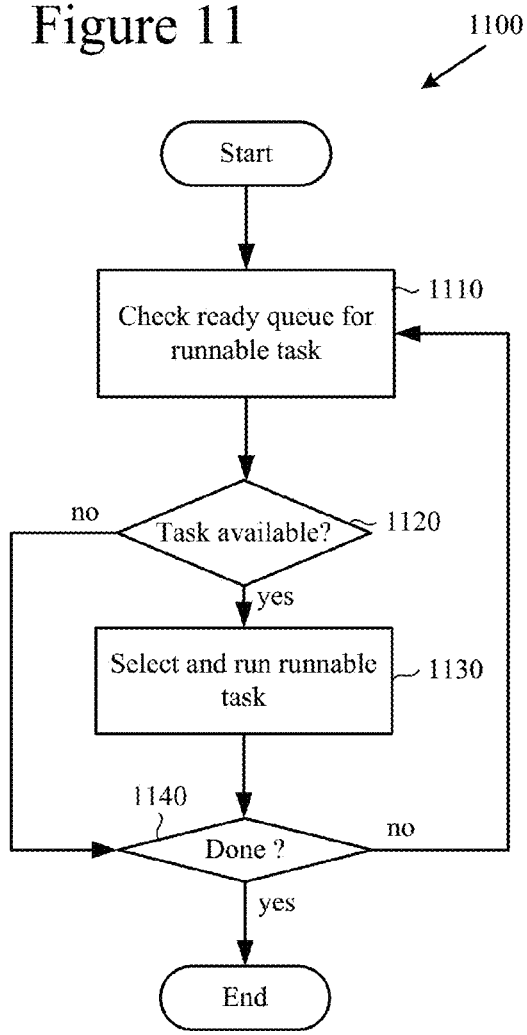
FIG. 11 is a flow chart showing a generalized technique for using a priority queue for runnable decoding tasks in a described implementation.

In some implementations, a priority queue (which can also be referred to as a ready queue, an accelerator queue, or, for GPU-runnable tasks, a GPU queue) is a queue or set of queues to which runnable tasks are added. Available threads check the ready queue for runnable tasks and select a task to run. FIG. 11 shows a generalized technique (1100) for using a priority queue for runnable tasks in one implementation. In a system comprising plural hardware threads suitable for performing decoding tasks, a thread checks (1110) the priority queue for a runnable task. If a runnable task is available (1120), the thread selects and runs (1130) a runnable task from the priority queue. After performing the check of the priority queue and running a runnable task if one is available, if decoding is done (1140), the process ends. Otherwise, the thread checks (1110) the priority queue again for runnable tasks.

More than one priority queue can be used at a time. For example, a priority queue for available CPU threads may be used in combination with a GPU priority queue for GPU runnable tasks in a system comprising one or more GPUs.

The priority queue may be prioritized based only on when the task became runnable (a simple first-in, first-out queue). More preferably, however, tasks are prioritized by some measure of their importance to the overall decoding process, as described below.

Alternatively, other data structures for scheduling and/or prioritizing tasks can be used.

2. Scheduling Order/Priority Order

The design of a scheduling order (also called priority order) for runnable tasks is an important factor in the performance of the multi-thread decoder. Scheduling order affects how soon a particular task can run relative to the other tasks in the priority queue. In one implementation, tasks with higher priority are added closer to the front of the queue than tasks with lower priority (which are added closer to the back of the queue). One example of a high priority task is an entropy decoding task, because many other decoding tasks will typically depend on it. Another example of a high priority task is a top field task, because bottom field tasks for the bottom field of a frame often depend on completion of top field tasks in the same frame.

Different priorities (and therefore, different orderings) are possible based on design criteria and can result in different best/average/worst performance in terms of throughput and latency. A combination of theoretical analysis, heuristics and empirical experimentation can be used to determine a scheduling order suitable to achieve desirable results.

In some implementations, the scheduling scheme takes into account whether threads are treated as software threads or hardware threads (HTs) bound to a particular hardware core. Scheduling design can incorporate mechanisms such as HT binding to the same core for better instruction cache (or "ICache") pressure or other benefits. When multiple cores and/or HTs share the same instruction cache, it is preferable to run the same tasks on these cores so that their code is shared on the same instruction cache lines. This is especially beneficial when the instruction cache is small. Therefore, a scheme to intelligently bind those tasks could be beneficial.

3. "Raster Scan" Order

Figure 12:
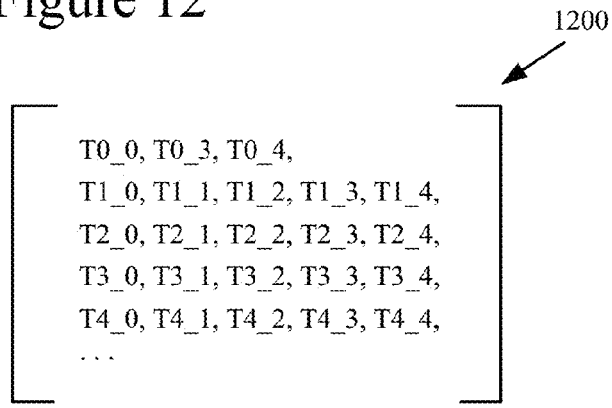
FIG. 12 is a diagram showing an example priority order for decoding tasks shown in FIG. 10A in a described implementation.

One of the simpler priority ordering schemes is to set inter-picture priority for tasks based on a current picture count, and to set intra-picture priority based on a task index. The example priority order (1200) shown in FIG. 12 is in a "raster scan" pattern (left to right within a row, top row to bottom row) for the example shown in FIG. 10A. In FIG. 12, the notation Ti_j is used to represent the task j in the ith frame. Tasks for additional pictures not shown in FIG. 10A could be represented in the ordering as well.

The priority ordering is straightforward for frame J0 (tasks T0__0, T0__3, and T0__4), since there are no inter-frame dependencies for these tasks. However, some tasks for frame P1 depend on tasks for frame I0, so priorities for frame P1 tasks are less clear. For example, task T1__1 depends on both T1__0 and T0__4. A simple choice is to give the tasks on which T1__1 depends equal priority. Alternatively, the average completion time for the task T1__0 and T0__4 can be taken into account, giving the task with longer average completion time higher priority in order to start the task sooner and possibly reduce the overall wait time for T1__1.

4. Priority Inversion

One shortcoming of the "raster scan order" scheduling model described above is the possibility of "priority inversion." For example, if coefficient decoding takes a large amount of time in the example frames shown in FIG. 10A, the tasks Ti__0 take a long time to complete while other tasks Ti_j (where j>0) wait on their dependency resolutions.

Suppose when decoding begins the tasks in a priority queue are: T0__0, T1__0, T2__0, T3__0 and T4__0. Referring again to FIG. 12, tasks like T2__0 and T3__0 have lower priority than other tasks for frames P1 and I0, but these lower priority tasks appear in the priority queue at the very beginning of decoding because other higher priority tasks (e.g., T0__3) cannot run until tasks on which they depend (e.g., T0__0) are completed. When T0__0 is completed, a decoder will often be better served to immediately run T0__3 in favor of running task T3__0. But if a thread has already started running task T3__0, a priority inversion occurs: a lower priority task (here, T3__0) occupies a thread while a higher priority task (here, T0__3) waits for execution. One way to reduce priority inversion is by "segmenting" tasks.

5. Task Segmentation

The tasks described so far have involved performing a decoding stage (e.g., entropy decoding, motion compensation, etc.) for an entire picture. However, in some cases there are advantages to defining a task as being for only a portion of a picture. This idea is referred to herein as segmenting tasks, or task segmentation.

For example, since motion compensation and inverse frequency transforms are inherently parallel processes, it is possible to divide a picture into M equal segments and have M segmented tasks (e.g., T1__1_k, where the index k (where 0≤k<M) indicates the segment index). Segmentation is also possible for a serial process like entropy decoding, although a segmented entropy decoding task may need to be performed one at a time and in order (e.g., top to bottom). For example, for segmented tasks T0__0_k where entropy decoding segments are not independently decodable (e.g., in pictures without slices), T0__0_k+1 can depend on T0__0_k.

Figure 13A:
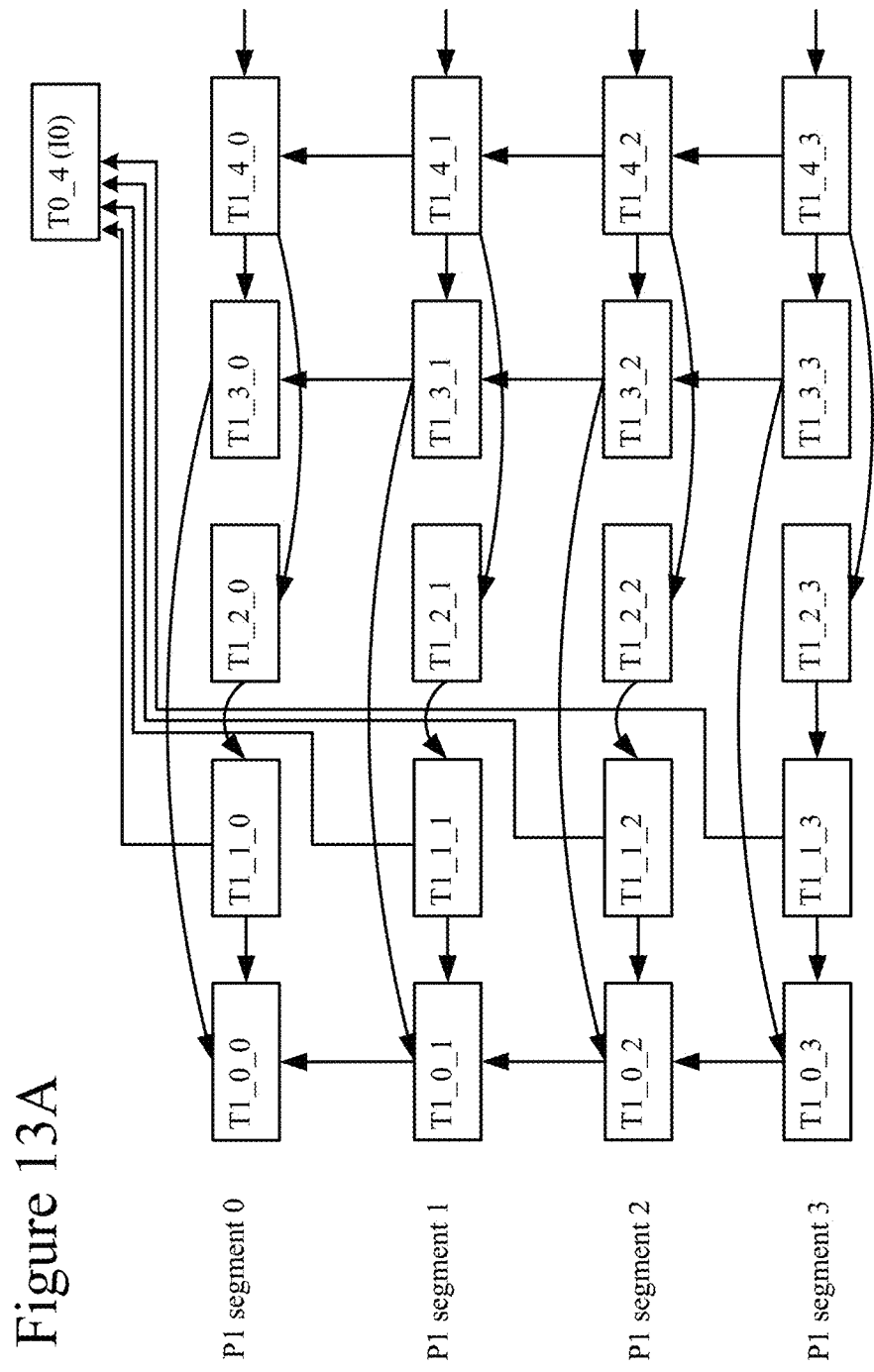
FIGS. 13A and 13B are diagrams showing dependencies for segmented tasks for a progressive P-frame or an interlaced P-frame in a described implementation.

Taking the decoding of frame P1 from FIG. 10A as an example, FIG. 13A is a diagram showing dependencies for the segmented tasks for frame P1. As shown in FIG. 13A, each stage has been divided into 4 segmented tasks. Each segmented task is now conceptually only a quarter of a task that involved the entire frame in FIG. 10A (although, in reality, different segments may be for arbitrarily sized portions and take more or less than a quarter of the processing time for that stage). The segmented tasks for stages that depended on the entropy decoding stage are now dependent on the corresponding segmented entropy decoding tasks. This can reduce latency, particularly when segmented tasks can be performed in parallel (as in later tasks).

In some embodiments, without segmentation, when decoding begins the tasks in the ready queue are entropy decoding tasks, which do not depend on completion of any other decoding stage. Referring again to FIG. 1 OA, tasks T0__0, T1__0, T2__0, T3__0 and T4__0 begin in the priority queue. Tasks T2__0 and T3__0 have lower priority than tasks such as T1__1, but the lower priority tasks T2__0 and T3__0 appear in the priority queue at the very beginning of decoding because the other, higher priority tasks (e.g., T1__1) cannot run until tasks on which they depend (e.g., T1__0) are completed.

Figure 14:
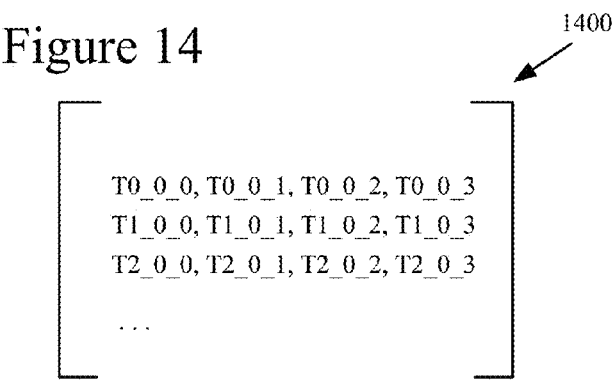
FIG. 14 is a diagram showing an example priority order for segmented entropy decoding tasks in a described implementation.

With task segmentation, entropy coding tasks in the priority queue can now be assigned the example priority order (1400) shown in FIG. 14. In the priority order (1400), the entropy decoding tasks for frame index 0 (T0__0_k) are higher priority than entropy decoding tasks for frame index 1 (T1__0_k), the entropy decoding tasks for frame index 1 are higher priority than the entropy decoding tasks for frame index 2 (T2__0_k), and so on. The available threads now have a better chance of working on more important tasks (e.g., T0__3_k), a quicker completion time for each segmented task, and a shorter wait time for other, segmented tasks to become runnable. If a lower-priority segmented task like T3__0_k is being executed by a thread, its completion time is much shorter than completing entropy decoding (T3__0) for an entire frame, and the thread that completes T0__0_k can check for runnable higher priority tasks such as T0__3 or T1__1 more quickly, reducing priority inversion effects.

Task segmentation also provides flexibility for scheduling from a hardware threading point of view. For example, task segmentation provides the opportunity to keep hardware threads on high priority tasks for groups of frames comprising lots of potential anchor frames (e.g., I- and P-frames) and increases the opportunity to pair tasks to hardware threads which share resources (e.g., memory) or to keep tasks apart if they will cause resource contention or overload.

6. Considerations for Loop Filtering Task Segmentation

In some cases, true parallel processing of loop filtering tasks may not be possible. For example, in the advanced profile of the VC-1 video codec standard, the 4×4 transform process couples rows together, making loop filtering a serial process.

Figure 13B:
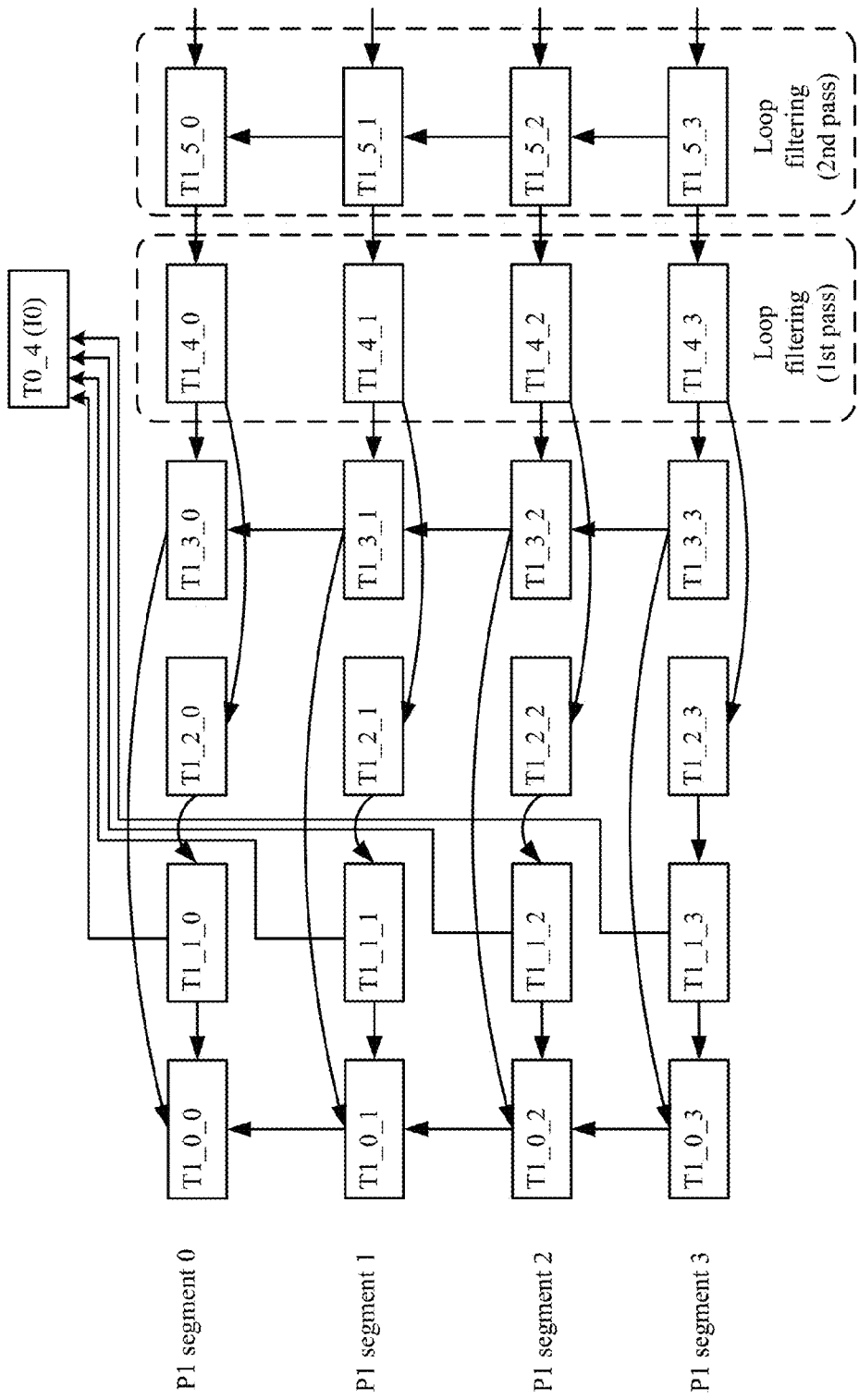

One option is to make the loop filtering stage a two-pass process, in which the first pass is a parallel process and the second pass is a serial process. FIG. 13B is based on FIG. 13A and shows a two-pass task arrangement for loop filtering. The first pass (parallel process) is shown as tasks T1__4_k, and the second pass (serial process) is shown as tasks T1__5_k. In FIG. 13B, the segments for the first pass each depend on the corresponding segmented tasks T1__2_k and T1__3_k, and the segments for the second pass each depend on the corresponding task in the first loop filtering pass (Ti__4_k) and the previous segment of the second loop filtering pass. Tasks in the first loop filtering pass (Ti__4_k) now can run in parallel and it might reduce latency if tasks Ti__2_k also run in parallel. However, the tasks Ti__5_k still need to be scheduled serially. Extra instruction cache pressure is another factor to consider.

H. Picture Decoding Initialization and Post Processing

Picture decoding initialization takes place between the main decoding processes for individual pictures. For example, during single thread decoding where loop filtering is the last stage in the main decoding process for a picture, picture decoding initialization occurs after loop filtering and before the entropy decoding stage for the next frame starts. In one implementation, picture decoding initialization includes the following operations.

Before picture decoding starts for a current picture (e.g., before entropy decoding begins):
  retrieve a free picture from the free picture pool, and attach it as the current buffer to a frame holder to make it a WFH; and
  set up reference pictures. (In one implementation, this involves calling the function switchFrame( ) an operation to set up the necessary reference picture(s) for decoding the current picture, using the reference pictures and decoded picture from decoding of the previous picture. Setting up reference pictures also may involve calling the function intensityCompensation( ) when intensity compensation is activated for a picture.)

After picture decoding finishes for the current picture (e.g., after loop filtering for the current picture is complete):
  detach and output the current picture to the output picture pool and return the frame holder to its "non working" (NWFH) state; and
  perform color conversion or other post-processing operations, if appropriate, on the associated output picture in the output picture pool.

In one implementation, when a reference picture can no longer be a reference picture for any decoded or to-be-decoded pictures in the frame holders, this is the retirement point for the reference picture, and the resources for it go back to the free picture pool.

In one implementation, the output stage (which includes color conversion and other post-processing stages) is decoupled from the decoding loop (e.g., loop filtering and preceding stages) because the decoder need not wait for the output of post-processing to be completed to perform decoding tasks for other pictures, and because the GetOutputMT( ) call from the application is asynchronous to the decoding process. GetOutputMT( ) is described in further detail below.

Figure 15:
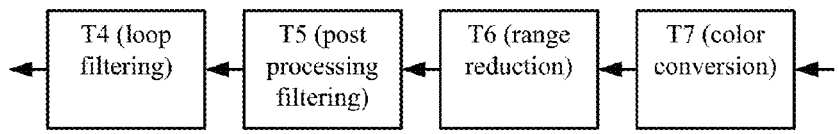
FIGS. 15 and 16 are block diagrams showing examples of post-processing tasks in a described implementation.

FIG. 15 is a block diagram showing an example of dependencies for post-processing tasks in one implementation. In the example shown in FIG. 15, the post-processing tasks include post-processing filtering (T5), range reduction (T6) and color conversion (T7). Post processing tasks T5, T6 and T7 ultimately depend only on the loop filtering task (T4) (a task in earlier decoding task diagrams). No decoding tasks for other pictures (e.g., entropy decoding, motion compensation, inverse frequency transformation, intra decoding) depend on the post processing tasks T5, T6 and T7. Post processing tasks T5, T6 and T7 can be scheduled in the same priority queue as the main decoding tasks. Their priorities are generally lower than other decoding tasks, however, because delays in their completion only affect display/output latency and do not affect decoding of other pictures.

Figure 16:
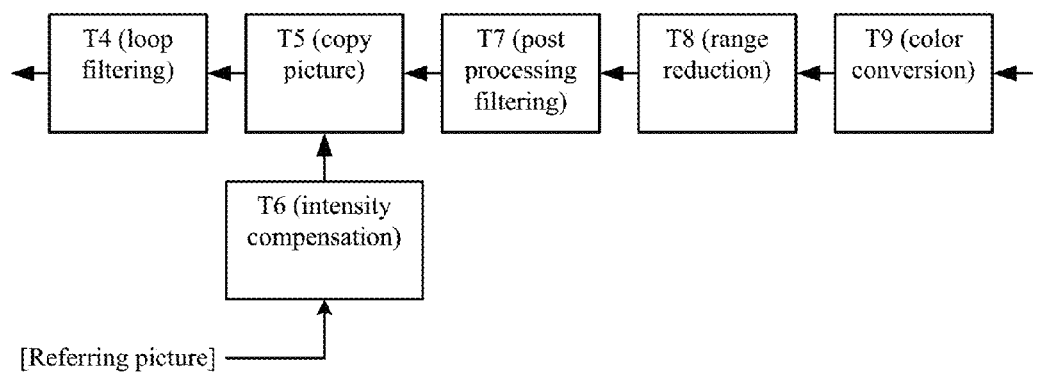

FIG. 16 is a block diagram showing another example of dependencies for post-processing tasks. In the example shown in FIG. 16, intensity compensation (which also can be referred to as weighted prediction or fading compensation) modifies a reference picture by changing luma and/or chroma values in the reference picture to compensate for fading or other effects in the video sequence. Intensity compensation can be performed on a picture-by-picture basis or some other basis. In the example shown in FIG. 16, intensity compensation depends on completion of the loop filtering task (T4), as do the other post processing tasks. Because intensity compensation modifies the reference picture, it is desirable to actually copy the picture in its post-loop-filtering state to another buffer first (T5 in FIG. 16), so that the slower post-processing tasks can be performed on the copied picture and the intensity compensation (T6 in FIG. 16) can be performed on a different copy of the reference picture.

For priority ordering, post-processing tasks can generally be set as lower priority than other decoding tasks. But if their priorities are too low, they may get stacked up and keep resources available for the free picture pool and the output picture pool low, which eventually may cause an increase in overall latency. One option is to lower their priority to the level of the next picture or some other subsequent picture.

I. Example Multi-Thread Decoder Design and API

This section describes an example multi-thread decoder design and application programming interface ("API"), including example code listings for various modules. Other API implementations can vary from the specific details described in this example in accordance with the principles described herein. The example API is similar to an API used for a single-threaded decoding system.

FIG. 17 is a diagram showing functionality of the example API in one implementation. The functions DecodeDataMT( ) and GetOutputMT( )) are called alternately by application (1710). When DecodeDataMT( ) is called, it performs some preprocessing to the bitstream (e.g., start code processing) and then creates tasks (possibly including segmented tasks) associated with a picture. This includes setting up dependency links as well as other initialization operations. It then adds runnable tasks (e.g., segmented or unsegmented tasks) to a priority queue.

DecodeDataMT( ) is non-blocking and returns a RETRY signal when there is no free frame holder available to take a new picture. The application calling the API is on a separate thread, independent from the hardware threads (HT0, HT1, HT2, HT3) performing the decoding tasks. In one implementation, the API is on a thread associated with core 2 in a three-core Xbox 360™ system. The non-blocking nature of DecodeDataMT( ) and GetOutputMT( ) allows the application to call DecodeDataMT( ) and GetOutputMT( ) frequently without affecting the main work of the decoding threads.

DecodeDataMT( ) also takes a parameter pInputBuffer, which is used for the compressed picture, and a parameter pOutputBuffer, which is used to fill the decompressed picture (associated with this compressed picture, but in display order) asynchronously by the decoding process. When GetOutputMT( ) is called, it returns the decompressed frames in display order, and if a frame is not ready for output, it will return a RETRY.

Both DecodeDataMT( ) and GetOutputMT( ) keep their own counts of pictures internally. The application is not required to keep and supply these counts to the decoder.

In one implementation, a streaming mode is not supported. For a high bit rate application such as a DVD application, the lack of a streaming mode should not adversely affect performance.

A difference from single-threaded decoding is that DecodeDataMT( ) directly takes an input compressed buffer as opposed to using a callback mechanism. One reason for this (implied by the example described with reference to FIG. 17) is that entropy decoding processes could be running for all 4 threads, and a callback would need to go through the application thread on a different core (e.g., core 2 in a three-core Xbox 360™ system), making an unnecessary cross-core context switch, Also, maintaining multiple sessions of bitstream feeds at the same time on the application side could be a burden.

1. Task Structure

FIG. 18 is a code listing with example code (1800) for an example task structure. It is hard-coded with a corresponding frame holder structure as an array, such as the example frame holder structure shown in FIG. 9. Alternatively, a decoder uses other code to implement the same task structure or a different task structure.

2. Scheduler( )

FIG. 19 is a code listing with example code (1900) showing an example scheduler function. Scheduler( ) gets called by a thread at task completion time. It takes a just-completed task and returns the highest priority task in a priority queue ("readyQ"). Alternatively, the decoder uses other code to implement the same function or a different scheduling function.

3. Thread Loop

FIG. 20 is a code listing with example code (2000) for an example thread function. The thread loop is the main thread function called once at the thread creation time, and it will only exit when the whole decoding process is finished. There is 1 instance per thread. Alternatively, the decoder uses other code to implement the same function or a different thread function.

4. Priority Queue Manipulation and Initial Task Setup Routines

FIGS. 21A-21D are code listings with example code (2100, 2110, 2120, 2130) for examples of priority queue ("ReadyQ") manipulation functions and routines for setting up initial tasks and task dependencies for new pictures. Alternatively, the decoder uses other code to implement the same priority queue manipulation functions or different priority queue manipulation functions.

5. API

FIGS. 22A and 22B are code diagrams with example code (2200, 2210) for an example of an API for performing multi-threaded video decoding. The Figures show example code for the DecodeDataMT( ) and GetOutputMT( ) functions discussed above, which are called alternately. Each of them may return a RETRY signal, indicating to the application to make a repeat call with the same parameters the next time the API is called. The parameter pOutputBuffer to the DecodeDataMT( ) call is the pointer to the output buffer for this DecodeDataMT( ) call. A picture output into this buffer may not always be the picture encoded in the compressed bits passed by reference with this DecodeDataMT( ) call, as some reordering may happen. The application verifies that the pOutputBuffer does not overlap with other outstanding buffers that have not been retrieved yet.

Alternatively, the application passes in a NULL pointer as pOutputBuffer for this decodeDataMT( ) call. The decoder keeps an internally pre-allocated output picture pool from which it can retrieve a picture in place of the external picture. Then, at GetOutputMT( ) time for this picture, the application passes in a valid external buffer pointer so that the decoder can "memcpy" the internal picture into the provided external picture buffer. The internal output picture then gets re-cycled. Note it is only in this case that GetOutputMT( ) should pass a valid pExternalOutputBuffer. The application may want to consider using memcpy and a valid external buffer pointer when its output buffer memory is limited, it still wants the decoder to minimize its decoding latency, and it can take an extra memcpy. The application can consider selecting this scheme on a picture by picture basis or some other basis. Also, DecodeDataMT( ) takes pInputBuffer as the compressed buffer, and a streaming mode is not supported.

Alternatively, the decoder uses other code to implement the DecodeDataMT( ) and GetOutputMT( )) functions or different API functions.

J. Extensions and Alternatives

A light-weight time-stamping mechanism can be used to track tasks. This not only can help in tuning the scheduling algorithm and debugging with different content scenarios, it could be an integral part of the scheduling if statistical timing information is used.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising plural processing units and memory that implement a video decoder system, the video decoder system comprising:
a buffer configured to receive encoded video information; and
a video decoder configured to perform decoding the encoded video information using plural decoding tasks, wherein a first video decoding stage is split into plural segmented decoding tasks among the plural decoding tasks, the plural segmented decoding tasks being associated with different segments of a picture, wherein the first video decoding stage includes one or more of entropy decoding operations, motion compensation operations, intra decoding operations, and inverse frequency transform operations, and wherein the decoding includes:
scheduling and executing plural parallel runnable segmented tasks, among the plural segmented decoding tasks, wherein at least two of the plural parallel runnable segmented tasks are at least in part executed in parallel by different ones of plural hardware threads;
scheduling and executing another decoding task, among the plural decoding tasks, wherein the other decoding task includes a second decoding stage for the picture, wherein the second decoding stage includes loop filtering operations, wherein the other decoding task has at least one task dependency on at least one of the plural segmented decoding tasks, and wherein the other decoding task is scheduled based at least in part on the at least one task dependency on the at least one of the plural segmented decoding tasks, including performing the other decoding task with one of the plural hardware threads.

2. The computer system of claim 1 wherein each of the plural processing units has two or more of the plural hardware threads.

3. The computer system of claim 1 wherein the picture is a first frame among the plural video frames, wherein the plural decoding tasks include a decoding task for a second frame among the plural video frames, the second frame being earlier in decoding order than the first frame, wherein at least one of the plural segmented decoding tasks for the segments of the first frame has a task dependency on the decoding task for the second frame, and wherein the decoding task for the second frame is scheduled before the plural segmented decoding tasks for the segments of the first frame.

4. The computer system of claim 1 wherein the plural decoding tasks are prioritized such that higher priority is given to tasks associated with pictures that are earlier in decoding order and lower priority is given to tasks associated with pictures that are later in decoding order.

5. The computer system of claim 1 wherein the computer system further comprises a graphics processing unit.

6. The computer system of claim 1 wherein the plural processing units are plural cores, and wherein each of the plural hardware threads is associated with one of the plural cores.

7. The computer system of claim 1 wherein one of the plural decoding tasks includes post-processing operations and/or color conversion operations outside of a main decoding loop that includes the plural segmented decoding tasks.

8. The computer system of claim 1 wherein at least one of the plural segmented decoding tasks depends on another of the plural segmented decoding tasks.

9. The computer system of claim 1 wherein none of the plural segmented decoding tasks depends on any other tasks of the plural segmented decoding tasks.

10. The computer system of claim 1 wherein the segments are arbitrarily sized portions of the picture.

11. The computer system of claim 1 wherein the loop filtering operations depend on completion of the motion compensation operations and the intra decoding operations for the picture.

12. One or more computer-readable media storing computer-executable instructions for causing a computer system programmed thereby to perform video decoding operations, the computer system comprising plural processing units and memory, wherein the one or more computer-readable media are selected from the group consisting of memory, magnetic disk storage, CD ROM and DVD, the video decoding operations comprising:
receiving encoded video information at a video decoder implemented with the computer system; and
decoding the encoded video information using plural decoding tasks, wherein a first video decoding stage is split into plural segmented decoding tasks among the plural decoding tasks, the plural segmented decoding tasks being associated with different segments of a picture, wherein the first video decoding stage includes one or more of entropy decoding operations, motion compensation operations, intra decoding operations, and inverse frequency transform operations, and wherein the decoding includes:
scheduling and executing plural parallel runnable segmented tasks, among the plural segmented decoding tasks, wherein at least two of the plural parallel runnable segmented tasks are at least in part executed in parallel by different ones of plural hardware threads; and
scheduling and executing another decoding task, among the plural decoding tasks, wherein the other decoding task includes a second decoding stage for the picture, wherein the second decoding stage includes loop filtering operations, wherein the other decoding task has at least one task dependency on at least one of the plural segmented decoding tasks, and wherein the other decoding task is scheduled based at least in part on the at least one task dependency on the at least one of the plural segmented decoding tasks, including performing the other decoding task with one of the plural hardware threads.

13. The one or more computer-readable media of claim 12 wherein each of the plural processing units has two or more of the plural hardware threads.

14. The one or more computer-readable media of claim 12 wherein the plural decoding tasks are prioritized such that higher priority is given to tasks associated with pictures that are earlier in decoding order and lower priority is given to tasks associated with pictures that are later in decoding order.

15. The one or more computer-readable media of claim 12 wherein the plural processing units are plural cores, and wherein each of the plural hardware threads is a associated with one of the plural cores.

16. The one or more computer-readable media of claim 12 wherein the video decoding operations are performed in response to a call to a function of an application programming interface.

17. The one or more computer-readable media of claim 12 wherein the segments are arbitrarily sized portions of the picture.

18. The one or more computer-readable media of claim 12 wherein none of the plural segmented decoding tasks depends on any other tasks of the plural segmented decoding tasks.

19. The one or more computer-readable media of claim 12 wherein the loop filtering operations depend on completion of the motion compensation operations and the intra decoding operations for the picture.

20. In a computer system, a method of video decoding, the computer system comprising plural processing units and memory, the method comprising:
- receiving encoded video information at a video decoder implemented with the computer system, wherein the computer system has plural hardware threads, and wherein each of the plural processing units has two or more of the plural hardware threads; and
- decoding the encoded video information using plural decoding tasks, wherein a first video decoding stage is split into plural segmented decoding tasks among the plural decoding tasks, the plural segmented decoding tasks being associated with different segments of a picture, wherein the first video decoding stage includes entropy decoding operations, motion compensation operations, intra decoding operations, and inverse frequency transform operations, and wherein the decoding includes:
  - scheduling and executing plural parallel runnable segmented tasks, among the plural segmented decoding tasks, wherein at least two of the plural parallel runnable segmented tasks are at least in part executed in parallel by different ones of the plural hardware threads; and
  - scheduling and executing another decoding task, among the plural decoding tasks, wherein the other decoding task includes a second decoding stage for the picture, wherein the second decoding stage includes loop filtering operations, wherein the other decoding task has at least one task dependency on at least one of the plural segmented decoding tasks, and wherein the other decoding task is scheduled based at least in part on the at least one task dependency on the at least one of the plural segmented decoding tasks, including performing the other decoding task with one of the plural hardware threads.

\* \* \* \* \*